(12) United States Patent
Higashi

(10) Patent No.: US 10,732,606 B2
(45) Date of Patent: Aug. 4, 2020

(54) INFORMATION PROCESSING APPARATUS, INFORMATION PROCESSING METHOD, AND INFORMATION PROCESSING SYSTEM

(71) Applicant: Haruomi Higashi, Kanagawa (JP)

(72) Inventor: Haruomi Higashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 293 days.

(21) Appl. No.: 15/584,118

(22) Filed: May 2, 2017

(65) Prior Publication Data

US 2017/0329303 A1  Nov. 16, 2017

(30) Foreign Application Priority Data

May 13, 2016  (JP) .................................. 2016-097100
Mar. 13, 2017  (JP) .................................. 2017-047187

(51) Int. Cl.
*G05B 19/00*  (2006.01)
*G05B 19/406*  (2006.01)

(52) U.S. Cl.
CPC .. *G05B 19/406* (2013.01); *G05B 2219/31455* (2013.01); *G05B 2219/32222* (2013.01)

(58) Field of Classification Search
CPC .................................................... G05B 19/406
USPC ........................................................ 702/183
See application file for complete search history.

(56) References Cited

U.S. PATENT DOCUMENTS

| 5,566,092 | A  | * | 10/1996 | Wang .................. | G05B 19/4184 |
| | | | | | 700/159 |
| 7,933,742 | B2 | * | 4/2011  | Ishii ...................... | G01H 3/125 |
| | | | | | 340/438 |
| 8,146,433 | B2 | * | 4/2012  | Kishino .............. | G01M 13/045 |
| | | | | | 73/593 |
| 8,810,396 | B2 | * | 8/2014  | Hedin ................. | G01M 13/045 |
| | | | | | 340/540 |

(Continued)

FOREIGN PATENT DOCUMENTS

| JP | 4-316198 | 11/1992 |
| JP | 2006-184722 | 7/2006 |

(Continued)

OTHER PUBLICATIONS

Dictionary.com defining the term, "filter". (Year: NA).*

*Primary Examiner* — Hien D Khuu
(74) *Attorney, Agent, or Firm* — Harness, Dickey and Pierce, P.L.C.

(57) ABSTRACT

An information processing apparatus acquires detection information of a physical quantity that changes according to an operation state of a target device, transmits an acquisition request to the target device at predetermined time, to acquire context information relating to an operation status of the target device in response to the acquisition request, specifies a processing period in which the target device is in the middle of processing of the target object based on the predetermined time and the context information, extracts processing period detection information of the specified processing period from the detection information, and deter- (Continued)

mines an occurrence of a defect relating to processing by the target device during the processing period based on the processing period detection information and the context information used for specifying the processing period.

19 Claims, 14 Drawing Sheets

(56) References Cited

U.S. PATENT DOCUMENTS

| | | | | |
|---|---|---|---|---|
| 2007/0088454 | A1* | 4/2007 | Jalluri | G05B 19/4065 700/159 |
| 2018/0017960 | A1* | 1/2018 | Shirata | G05B 23/0221 |
| 2018/0143162 | A1* | 5/2018 | Kurokami | G01N 27/20 |
| 2018/0356282 | A1* | 12/2018 | Fukuda | G05B 19/4065 |

FOREIGN PATENT DOCUMENTS

| | | |
|---|---|---|
| JP | 2007-265210 | 10/2007 |
| JP | 2008-032948 | 2/2008 |

* cited by examiner

DETECTION INFORMATION MANAGEMENT DB

| SOUND ID | ACQUISITION DATE AND TIME INFORMATION (TIME STAMP) | SOUND DATA |
|---|---|---|
| 0001 | 20160307.152000.000 | ... |
| 0002 | 20160307.152000.050 | ... |
| 0003 | 20160307.152000.100 | ... |
| 0004 | 20160307.152000.150 | ... |
| 0005 | 20160307.152000.200 | ... |
| 0006 | 20160307.152000.250 | ... |
| ... | ... | ... |

FIG. 6

CONTEXT MANAGEMENT DB 34A

| CONTEXT ID | TRANSMISSION DATE AND TIME INFORMATION (TIME STAMP) | CONTEXT INFORMATION ||||| PROCESSING DETERMINATION CONDITION (THRESHOLD OF DRILL ROTATION NUMBER) |
| --- | --- | --- | --- | --- | --- | --- |
| | | OPERATION STATE OF PROCESSING MACHINE | SHAFT MOVING STATE | DRILL ROTATION NUMBER (rpm) | LOAD | |
| 0001 | 20160307.152030.200 | STOPPED | - | 0 | 0% | 0 |
| 0002 | 20160307.152030.250 | STOPPED | - | 0 | 0% | 0 |
| 0003 | 20160307.152030.300 | IN OPERATION | HIGH-SPEED MOVING | 0 | 0% | 0 |
| 0004 | 20160307.152030.350 | IN OPERATION | CUTTING MOVING | 200 | 70% | 1000 |
| 0005 | 20160307.152030.400 | IN OPERATION | CUTTING MOVING | 800 | 80% | 1000 |
| 0006 | 20160307.152030.450 | IN OPERATION | CUTTING MOVING | 1000 | 100% | 1000 |
| 0007 | 20160307.152030.500 | IN OPERATION | CUTTING MOVING | 1000 | 100% | 1000 |
| 0008 | 20160307.152030.550 | IN OPERATION | HIGH-SPEED MOVING | 500 | 0% | 0 |
| 0009 | 20160307.152030.600 | IN OPERATION | HIGH-SPEED MOVING | 100 | 0% | 0 |
| ⋮ | ⋮ | ⋮ | ⋮ | ⋮ | ⋮ | ⋮ |

FIG. 7

PROCESSING PERIOD MANAGEMENT DB 45A

| PROCESSING PERIOD ID | PROCESSING/ NON-PROCESSING DETERMINATION RESULT | PERIOD | DATE TIME INFORMATION (TIME STAMP) | SOUND DATA |
|---|---|---|---|---|
| 0001 | IN MIDDLE OF PROCESSING | PROCESSING PERIOD | 20160307.152030.200 | Data0001.wave |
|  | NOT IN MIDDLE OF PROCESSING |  | 20160307.152530.400 |  |
| 0002 | IN MIDDLE OF PROCESSING | PROCESSING PERIOD | 20160307.160030.500 | Data0002.wave |
|  | NOT IN MIDDLE OF PROCESSING |  | 20160307.160530.500 |  |
| 0003 | IN MIDDLE OF PROCESSING | PROCESSING PERIOD | 20160307.161500.300 | Data0003.wave |
|  | NOT IN MIDDLE OF PROCESSING |  | 20160307.162000.300 |  |
| ... | ... | ... | ... | ... |

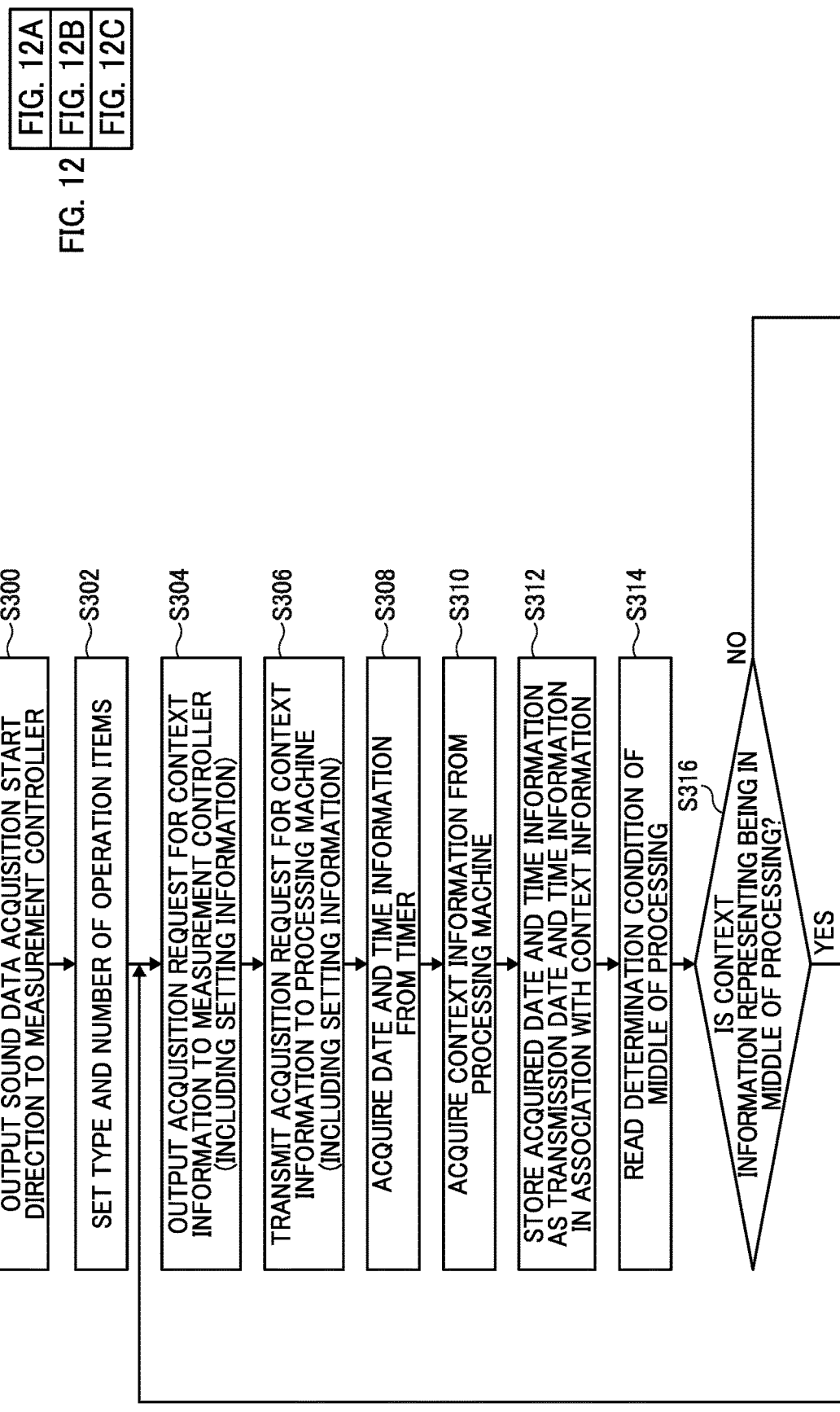

INFORMATION PROCESSING APPARATUS, INFORMATION PROCESSING METHOD, AND INFORMATION PROCESSING SYSTEM

CROSS-REFERENCE TO RELATED APPLICATIONS

This patent application is based on and claims priority pursuant to 35 U.S.C. § 119(a) to Japanese Patent Application Nos. 2016-097100, filed on May 13, 2016, and 2017-047187, filed on Mar. 13, 2017, in the Japan Patent Office, the entire disclosure of which is hereby incorporated by reference herein.

BACKGROUND

Technical Field

The present invention relates to an information processing apparatus, an information processing method, a recording medium having an information processing program recorded on the recording medium, and an information processing system.

Description of the Related Art

Technologies for diagnosing an abnormality of a target device such as a processing machine from the outside of the target device are known.

Some systems detect an abnormal sound when a difference between operation sound data of units (a drum motor, sheet feeding motor, a fixing motor, a developing clutch, and the like) collected in advance and operation sound data collected by operating an image forming apparatus is a predetermined level or more. Some systems determine the presence of an abnormality in a device in a case where the peak of a sound pressure level appearing in the waveform of sound data collected by a sound collector exceeds a specified value.

SUMMARY

Example embodiments of the present invention include an information processing apparatus acquires detection information of a physical quantity that changes according to an operation state of a target device, transmits an acquisition request to the target device at predetermined time, to acquire context information relating to an operation status of the target device in response to the acquisition request, specifies a processing period in which the target device is in the middle of processing of the target object based on the predetermined time and the context information, extracts processing period detection information of the specified processing period from the detection information, and determines an occurrence of a defect relating to processing by the target device during the processing period based on the processing period detection information and the context information used for specifying the processing period.

Example embodiments of the present invention include a system including the information processing apparatus, and the target device.

Example embodiments of the present invention include a method performed by the information processing apparatus, and a non-transitory recording medium storing a plurality of instructions for causing the information processing apparatus to perform the information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is a schematic diagram illustrating an example of the data configuration of a detection information management database (DB);

FIG. 6 is a schematic diagram illustrating an example of the data configuration of a context management DB;

FIG. 7 is a schematic diagram illustrating an example of the data configuration of a processing period management DB;

FIGS. 12A to 12C (FIG. 12) are a flowchart illustrating an example of an abnormality determining process.

Figure 1:
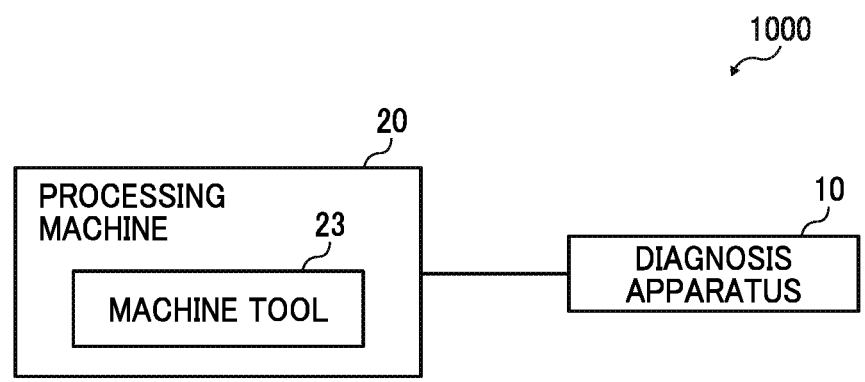
FIG. 1 is a schematic diagram illustrating an overview of an example of the configuration of an information processing system.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an information processing apparatus, an information processing method, a recording medium having an information processing program recorded on the recording medium, and an information processing system according to an embodiment will be described in detail referring to the accompanying drawings. In this embodiment, a form in which an information processing apparatus is applied to a diagnosis apparatus will be described as an example.

First Embodiment

FIG. 1 is a schematic diagram illustrating an overview of an example of the configuration of an information processing system 1000 according to this embodiment.

The information processing system 1000 includes a processing machine 20 and a diagnosis apparatus 10. The diagnosis apparatus 10 and the processing machine 20 are connected to be communicable with each other. The processing machine 20 and the diagnosis apparatus 10 may be connected in a certain connection form. For example, the processing machine 20 and the diagnosis apparatus 10 are connected through a wired network such as a dedicated connection line or a wired local area network (LAN), a wireless network, or the like.

The processing machine 20 is an example of a target device that is a target for a diagnosis of an abnormality using the diagnosis apparatus 10. In the processing machine 20, a machine tool 23 is disposed. The machine tool 23 is a machine for processing a processing target. In the machine tool 23, tools 59 (see FIG. 2) such as a drill, a cutter, and a table are disposed. The machine tool 23 processes a target object by using the tool 59.

The diagnosis apparatus 10 is an apparatus that diagnoses the processing machine 20. In this embodiment, the diagnosis apparatus 10 determines the occurrence of a defect relating to the processing using the processing machine 20.

Figure 2:
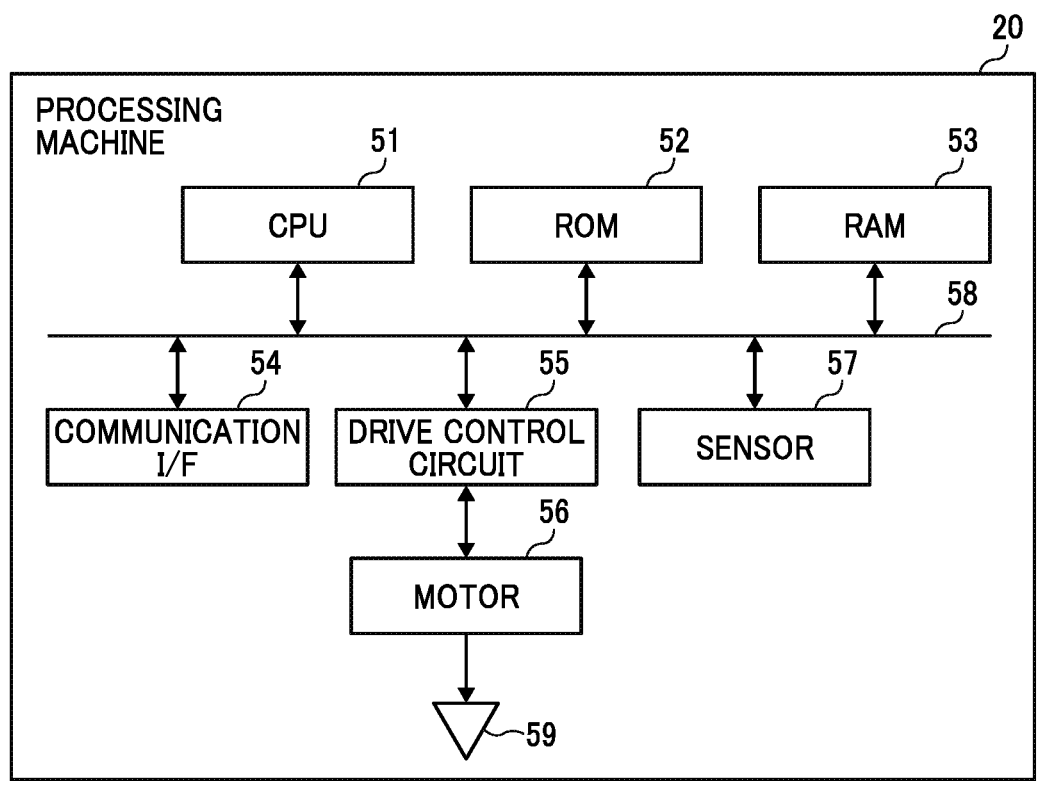
FIG. 2 is a block diagram illustrating an example of the hardware configuration of a processing machine.

FIG. 2 is a block diagram illustrating an example of the hardware configuration of the processing machine 20. As illustrated in FIG. 2, the processing machine 20 has a configuration in which a central processing unit (CPU) 51, a read only memory (ROM) 52, a random access memory (RAM) 53, a communication I/F (interface) 54, a drive control circuit 55, and a sensor 57 are connected through a bus 58.

The CPU 51 controls an overall operation of the processing machine 20. The CPU 51, for example, executes a program stored in the ROM 52 or the like by using the RAM 53 as a work area, thereby controlling the overall operation of the processing machine 20 to perform a processing process.

The communication I/F 54 is an interface used for communicating with an external apparatus such as the diagnosis apparatus 10. The drive control circuit 55 is a circuit that controls the driving of the motor 56. The motor 56 drives the tool 59.

Figure 3:
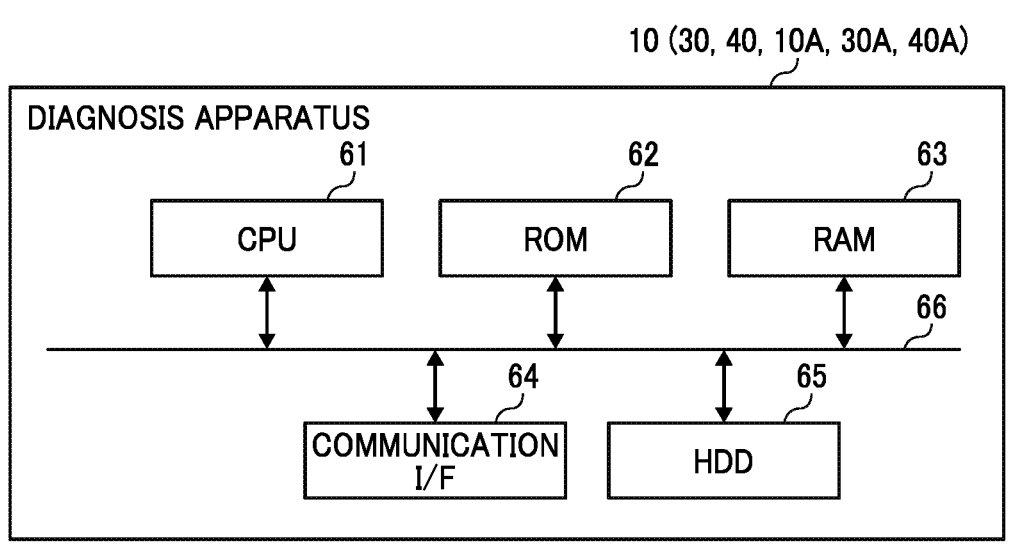
FIG. 3 is a block diagram illustrating an example of the hardware configuration of a diagnosis apparatus.

FIG. 3 is a block diagram illustrating an example of the hardware configuration of the diagnosis apparatus 10. As illustrated in FIG. 3, the diagnosis apparatus 10 has a configuration in which a CPU 61, a ROM 62, a RAM 63, a communication I/F 64, and a hard disk drive (HDD) 65 are connected through a bus 66.

The CPU 61 controls the overall operation of the diagnosis apparatus 10. The CPU 61, for example, executes a program stored in the ROM 62 or the like by using the RAM 63 as a work area, thereby controlling the overall operation of the diagnosis apparatus 10 to perform a diagnosis process. The communication I/F 64 is an interface used for communicating with an external device such as the processing machine 20. The HDD 65 stores various kinds of data. Instead of the HDD 65 or together with the HDD 65, a nonvolatile storage such as an electrically erasable programmable read-only memory (EEPROM) or a solid state drive (SSD) may be included.

Figure 4:
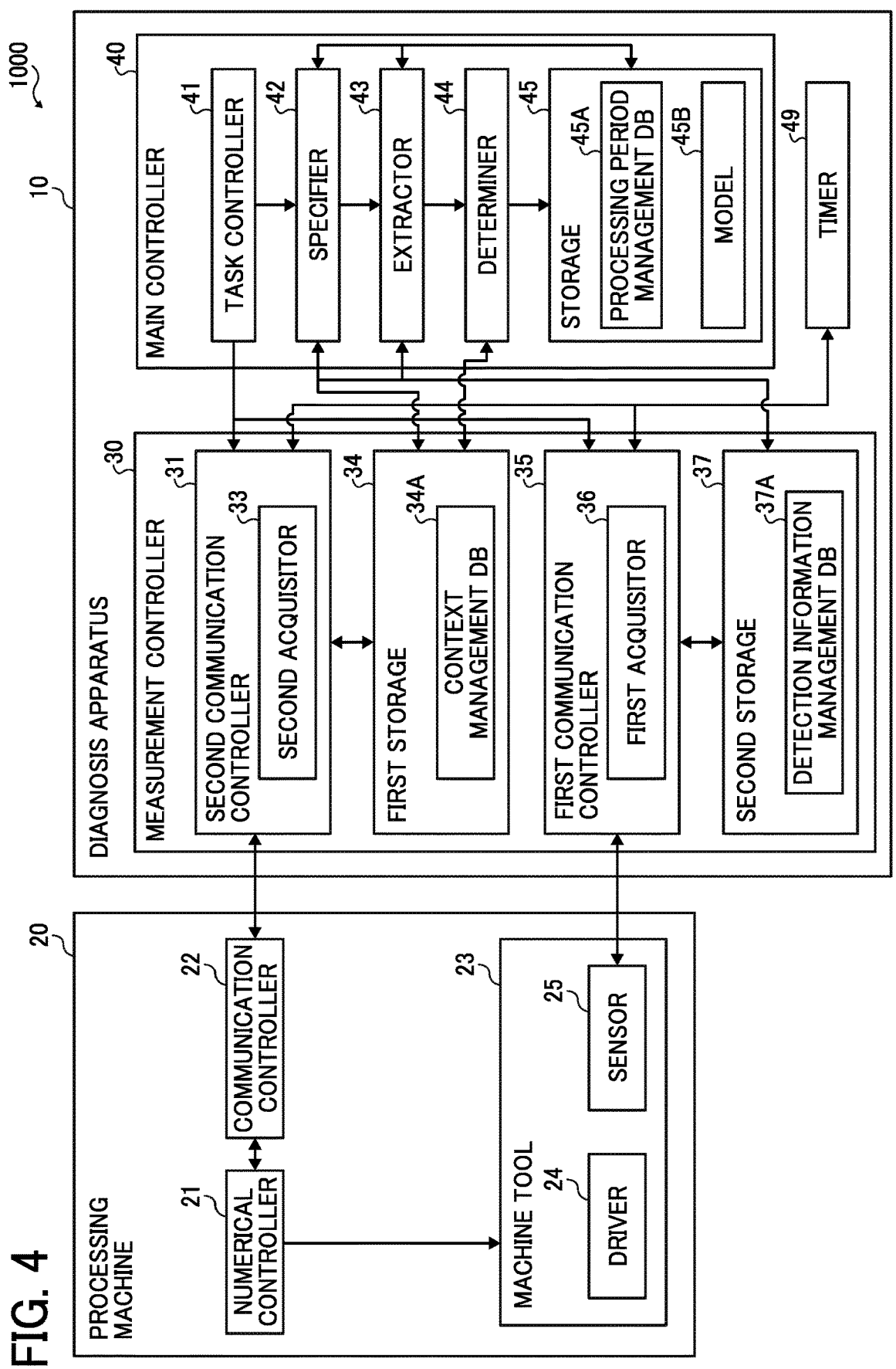
FIG. 4 is a block diagram illustrating an example of functional configurations of a processing machine and a diagnosis apparatus.

FIG. 4 is a block diagram illustrating an example of functional configurations of the processing machine 20 and the diagnosis apparatus 10 arranged in the information processing system 1000.

The processing machine 20 includes a numerical controller 21, a communication controller 22, and a machine tool 23.

The machine tool 23 includes a sensor 25 and a driver 24.

The driver 24 drives the tools 59 such as a drill under the control of the numerical controller 21. A target object is processed according to the driving of the tools 59. The driver 24, for example, is realized by a motor 56 (see FIG. 2). The driver 24 may be any member that is used for processing and is a target for numerical control. In addition, the machine tool 23 may include a plurality of drivers 24.

In the description, it is assumed that the number of the tools 59 operating at one time in the processing machine 20 is one. In other words, also in a case where the machine tool 23 is configured to include a plurality of drivers 24 or tools 59, the number of tools 59 operating at one time is assumed to be one in the description.

The sensor 25 is a detector that detects a physical quantity that changes according to the operation state of the processing machine 20. The sensor 25 transmits detection information (sensor data) representing a detected physical amount to the diagnosis apparatus 10. The sensor 25, for example, corresponds to the sensor 57 illustrated in FIG. 2.

In this embodiment, the physical quantity is data that represents a vibration at the time of processing a target object by using the tool 59. The data representing the vibration is vibration data representing the vibration itself, sound data (may be also referred to as acoustic data) of sound generated according to the vibration, sound wave data (AE wave data) of a sound wave generated according to the vibration, acceleration data of acceleration generated according to the vibration, or the like. The sensor 25, for example, is a microphone, a vibration sensor, an acceleration sensor, an acoustic emission (AE) sensor, or the like.

For example, in a case where the breakage of the blade of the tool 59 used for the processing, the chipping (a damage in the tool 59) of the blade of the tool 59, the wear of the tool 59, or the like occurs, data representing a vibration such as a sound generated from the tool 59 changes. In addition, in a case where time degradation or the like occurs in the bearing of the motor 56 driving the tool 59, also in a case where a foreign material is attached or the like, data representing the vibration such as a sound generated from the motor 56 during processing changes. For this reason, in this embodiment, the diagnosis apparatus 10 determines the occurrence of a defect relating to the processing using the processing machine 20 by using detection information of data representing a vibration such as sound data detected by the sensor 25.

Here, the number of sensors 25 included in the processing machine 20 is not limited to a specific number. In other words, the processing machine 20 may be configured to include one sensor 25, may be configured to include a plurality of sensors 25 detecting a same physical quantity, or may be configured to include a plurality of sensors 25 detecting mutually-different physical quantities.

The numerical controller 21 performs numerical control of the machine tool 23. The numerical controller 21 generates control data used for controlling the operation of the driver 24 and outputs the generated control data to the driver 24. The numerical controller 21 generates control data according to the type of operation (type of processing) corresponding to each processing process in accordance with the execution sequence of the processing process set in advance and outputs the generated control data to the driver 24. Accordingly, the driver 24 performs an operation represented in the control data and drives the tool 59, thereby processing a target object.

In addition, the numerical controller 21 transmits context information relating to the operation status (operation condition) of the driver 24 to the diagnosis apparatus 10. In other words, the numerical controller 21 transmits context information relating to the operation status represented in the control data, which is currently transmitted (or previously transmitted) to the driver 24, to the diagnosis apparatus 10.

The context information is information transmitted by the numerical controller 21 to the machine tool 23 in order to control the machine tool 23 (more specifically, the driver 24) and includes operation status information representing the operation status of the driver 24. In this embodiment, the context information is information that is set for each type of an operation (the type of processing) performed by the machine tool 23 (more specifically, the driver 24).

The operation status information includes values represented by operation items of a plurality of types that are different from each other. In other words, the operation status information included in the context information is configured by values of a plurality of operation items of which types are different from each other.

The operation items represent items of the operation status represented in the control data that is most recently transmitted (or to be transmitted from now) from the numerical controller 21 to the driver 24. The operation items, for example, are the operation state of the processing machine 20 (more specifically, the driver 24), a shaft moving state, a drill rotation number, a load applied to the tools (a drill and the like) 59, a processing determination condition, and the like.

A value represented by the operation item "the operation state of the processing machine 20", for example, is "in operation" representing that the processing machine 20 (more specifically, the driver 24) is in operation or "stopped" representing that the processing machine 20 is stopped. A value represented by the operation item "shaft moving state", for example, is "high-speed moving" representing that the moving state of the shaft of the tool 59 of the processing machine 20 is high-speed moving or "cutting moving" representing that the moving state is cutting moving.

A value represented by the operation item "drill rotation number" is revolutions per minute (rpm) of the tool (for example, the drill) 59 of the processing machine 20. A value represented by the operation item "load" is the value (%) of the load applied to the tool 59 of the processing machine 20.

The operation item "processing determination condition" represents a condition for determining that the machine tool 23 is in the middle of processing of a target object for values represented by the other operation items included in context information. A value represented by this operation item "processing determination condition", for example, is a threshold of the rotation number of the drill. In this case, in a case where the drill rotation number represents a value that is a value represented by the "processing determination condition" or more, it can be determined that the processing machine 20 is in the middle of processing a target object. Here, one type or a plurality of types of operation items "processing determination condition" may be included in one piece of context information.

In addition, the number and the types of operation items included in the context information are not limited to a specific value and specific types. However, the context information may include at least one operation item among a plurality of operation items represented in the control data. From the viewpoint of the improvement of the accuracy of the diagnosis, it is preferable that the number of operation items included in the context information transmitted from the processing machine 20 to the diagnosis apparatus 10 is large. Meanwhile, from the viewpoint of the shortening of a diagnosis time, it is preferable that the number of operation items included in the context information transmitted from the processing machine 20 to the diagnosis apparatus 10 is small.

In this embodiment, in the context information, at least operation items of types that can be used for determining a processing period on the diagnosis apparatus 10 side are included.

The communication controller 22 controls communication with an external apparatus such as the diagnosis apparatus 10. The communication controller 22 receives an acquisition request for context information from the diagnosis apparatus 10. In addition, in response to this acquisition request, the communication controller 22 transmits context information to the diagnosis apparatus 10. In other words, the numerical controller 21 transmits context information to the diagnosis apparatus 10 through the communication controller 22.

Next, the functional configuration of the diagnosis apparatus 10 will be described. The diagnosis apparatus 10 includes a measurement controller 30, a main controller 40, and a timer 49. The measurement controller 30, the main controller 40, and the timer 49 are connected so as to be able to transmit/receive data and signals to/from each other.

The timer 49 corresponds to a date and time timer. The timer 49 is a timer that transmits date and time information. The measurement controller 30 and the main controller 40 acquire date and time information by acquiring the date and time information from the timer 49. In addition, as the date and time information, a time stamp may be acquired.

The measurement controller 30 communicates with the processing machine 20. The main controller 40 controls the measurement controller 30.

In this embodiment, an example is illustrated in which the measurement controller 30 and the main controller 40 are functionally configured as separate bodies. However, the measurement controller 30 and the main controller 40 may be functionally configured as one body. In addition, the measurement controller 30 and the main controller 40 may be configured as separate bodies also as a hardware configuration. In such a case, each of the measurement controller 30 and the main controller 40 may have a hardware configuration illustrated in FIG. 3. In addition, also in a case where the measurement controller 30 and the main controller 40 are arranged as separate bodies either functionally or as a hardware configuration, the timer 49 is used for the acquisition of a time stamp using both the measurement controller 30 and the main controller 40.

The main controller 40 includes a task controller 41, a specifier 42, an extractor 43, a determiner 44, and a storage 45. The measurement controller 30 includes a second communication controller 31, a first storage 34, a first communication controller 35, and a second storage 37. The second communication controller 31 includes a second acquisitor 33. The first communication controller 35 includes a first acquisitor 36.

All or some of the second communication controller 31, the second acquisitor 33, the first communication controller 35, the first acquisitor 36, the task controller 41, the specifier 42, the extractor 43, and the determiner 44, for example, may be implemented by a processor such as a CPU that executes programs (in other words, software) to control hardware, or by hardware such as integrated circuits (IC).

The task controller 41 of the main controller 40 controls a task executed by the diagnosis apparatus 10. In this embodiment, the task controller 41 outputs a detection information acquisition start command or an acquisition request for context information to the measurement controller 30.

Hereinafter, for easy understanding of the description, a case will be described as an example in which detection information is sound data. For this reason, a case will be described in which the task controller 41 outputs a sound data acquisition start command to the measurement controller 30 as a detection information acquisition start command.

More specifically, the task controller 41 outputs a sound data acquisition start command to the first communication controller 35 of the measurement controller 30. The first communication controller 35 controls communication with the sensor 25 of the processing machine 20.

The first acquisitor 36 acquires detection information from the sensor 25. In other words, the first acquisitor 36 acquires detection information of a physical quantity that changes according to the operation state of the processing machine 20 processing a target object. In this embodiment, when a sound data acquisition start command is received from the task controller 41, the first acquisitor 36 starts the acquisition of sound data from the sensor 25.

The first acquisitor 36 stores the acquired sound data in the second storage 37 (second storage) in association with acquisition date and time information of the sound data. The first acquisitor 36 acquires date and time information at the time of the acquisition of the sound data from the timer 49 and uses the acquired date and time information as acquisition date and time information of the sound data. Then, the first acquisitor 36 stores the sound data and the date and time information that have been acquired in the second storage 37 in association with each other. The second storage 37 is a buffer that is used for storing the sound data acquired from the first acquisitor 36.

In addition, when the sound data acquisition start command is received, the first acquisitor 36 acquires sound data output from the sensor 25 as sound data delimited for each sampling time set in advance and sequentially stores the sound data in the second storage 37 in association with the acquired acquisition date and time information.

More specifically, the second storage 37 stores a detection information management DB 37A. The detection information management DB 37A is a database used for storing the sound data acquired by the first acquisitor 36. FIG. 5 is a schematic diagram illustrating an example of the data configuration of the detection information management DB 37A. The detection information management DB 37A associates a sound ID, acquisition date and time information, and sound data with one another.

The first acquisitor 36 acquires sound data output from the sensor 25 as sound data delimited for each sampling time set in advance and stores the sound data in the detection information management DB 37A in association with the acquired acquisition date and time information. A sound ID is identification information of the sound data.

In addition, the first acquisitor 36 repeatedly performs the acquisition of sound data and the storage of the sound data in the detection information management DB 37A until a system operation end command is received.

The description will be continued by referring back to FIG. 4. The task controller 41 outputs an acquisition request for context information to the measurement controller 30. The second communication controller 31 of the measurement controller 30 receives the acquisition request for context information from the task controller 41. The second communication controller 31 controls communication with the processing machine 20, an external device, and the like. The second communication controller 31 includes a second acquisitor 33. The second acquisitor 33 transmits an acquisition request to the processing machine 20 at predetermined time and acquires context information relating to the operation status of the processing machine 20 as a response to the acquisition request.

In more detail, when an acquisition request for context information is received from the task controller 41, the second acquisitor 33 transmits the acquisition request for context information to the processing machine 20.

When the communication controller 22 of the processing machine 20 receives the acquisition request for context information from the diagnosis apparatus 10, the numerical controller 21 of the processing machine 20 transmits context information relating to an operation status to the diagnosis apparatus 10 through the communication controller 22.

In this way, the second acquisitor 33 acquires the context information from the processing machine 20.

Then, every time when context information is acquired from the processing machine 20, the second acquisitor 33 stores the acquired context information in the first storage 34 in association with predetermined time at which an acquisition request corresponding to the context information is transmitted. Hereinafter, the predetermined time at which an acquisition request is transmitted will be referred to as transmission date and time information. Further, the predetermined time may be previously set, for example, by a manufacturer of the system.

The transmission date and time information is information that represents transmission date and time of an acquisition request transmitted from the diagnosis apparatus 10 to the processing machine 20 so as to acquire the context information.

The second acquisitor 33 acquires date and time information at the time of transmitting an acquisition request for context information to the processing machine 20 from the timer 49 and uses the acquired date and time information as transmission date and time information of the acquisition request. Then, the second acquisitor 33 stores the acquired context information and the transmission date and time information in the first storage 34 in association with each other.

The first storage 34 stores various kinds of data. The first storage 34, for example, is realized by an HDD 65 (see FIG. 3). In this embodiment, the first storage 34 stores a context management DB 34A.

The context management DB 34A is a database used for storing context information acquired from the processing machine 20. FIG. 6 is a schematic diagram illustrating an example of the data configuration of the context management DB 34A. The context management DB 34A associates a context ID, transmission date and time information, and context information with one another.

When context information is acquired, the second acquisitor 33 registers the context information acquired from the communication controller 22, the transmission date and time information of an acquisition request transmitted to the processing machine 20 so as to acquire the context information, and a context ID in the context management DB 34A in association with one another. The context ID is identification information of corresponding context information.

The specifier 42 of the main controller 40 specifies a processing period in which the processing machine 20 processes a target object based on predetermined time (transmission date and time information) at which context information and an acquisition request are transmitted. The processing period is a period in which the tool 59 disposed in the machine tool 23 processes a target object.

The specifying of the processing period will be described in detail. First, the specifier 42 determines context information representing being in the middle of processing among the context information acquired by the second acquisitor 33.

For the determination of the context information representing being in the middle of processing, values represented by a plurality of operation items included in the context information are used.

In addition, the specifier 42 reads a determination condition used for the determination. Then, the specifier 42 determines context information of which values represented by a plurality of operation items satisfy a reading determination condition as context information representing being in the middle of processing.

The specifier 42 uses at least one of the determination condition stored in advance and the processing determination condition included in the context information of a determination target as a determination condition of context information representing being in the middle of processing.

For example, in a case where a determination condition is stored in advance, the specifier 42 uses the determination condition as a determination condition used for determining whether or not context information is in the middle of processing. In addition, for example, in a case where context information includes the operation item "processing determination condition", the specifier 42 uses a value represented by the operation item "processing determination condition" included in the context information as a determination condition used for determining whether or not the context information is in the middle of processing.

In addition, the specifier 42 may use both a determination condition stored in advance and a processing determination condition included in the context information of a determination target as determination conditions.

For example, it is assumed that the determination condition stored in advance is a condition that a value represented by the operation item "the operation state of the processing machine 20" is "in operation" and a value represented by the operation item "shaft moving state" is "cutting moving". In addition, it is assumed that the operation item "processing determination condition" is included in the acquired context information, and a value (for example, the threshold of the drill rotation number") represented by the "processing determination condition" is 1,000 rpm.

In this case, the specifier 42 determines context information corresponding to context IDs "0006" and "0007" satisfying such a determination condition among the context information stored in the context management DB 34A illustrated in FIG. 6 as context information representing being in the middle of processing.

Then, the specifier 42 specifies a period represented by transmission date and time information corresponding to the context information determined to be in the middle of processing in the context management DB 34A as a processing period. More specifically, the specifier 42 is assumed to determine a plurality of pieces of context information of which the transmission date and time information is continuous in a time series in the context management DB 34A as a group of context information representing being in the middle of processing. In this case, the specifier 42 sets transmission date and time information of an acquisition request for context information of which the transmission date and time information is earliest (oldest) among the continuous context information belonging to the group of being in the middle of processing as start date and time of the processing period. In addition, the specifier 42 may set transmission date and time information of context information of which the transmission date and time information is latest (newest) among the continuous context information belonging to the group or transmission date and time information corresponding to context information acquired next after the context information as end date and time of the processing period.

The description will be continued by referring back to FIG. 4. The extractor 43 extracts sound data (processing period detection information) of a processing period specified by the specifier 42 from the sound data (detection information) acquired by the first acquisitor 36. In other words, the extractor 43 extracts sound data of a period corresponding to the processing period from sound data acquired by the first acquisitor 36.

In more details, the extractor 43 extracts processing period detection information of a period represented by acquisition date and time information corresponding to the transmission date and time information represented by the processing period specified by the specifier 42 from the sound data (detection information) acquired by the first acquisitor 36.

The extraction process performed by the extractor 43 will be described in detail.

In this embodiment, the diagnosis apparatus 10 repeats a process in which, every time when the second acquisitor 33 acquires context information and registers the acquired context information in the context management DB 34A, the specifier 42 determines whether or not the context information is context information representing being in the middle of processing, and the extractor 43 extracts sound data of timing corresponding to the context information determined to be in the middle of processing, whereby sound data of the processing period is extracted.

According to this repeated process, a period from date and time represented in the transmission date and time information corresponding to the context information determined to be in the middle of processing by the specifier 42 to date and time represented in the transmission date and time information corresponding to the context information determined to be not in the middle of processing next is specified as a processing period. In other words, a period represented by a group of transmission date and time information corresponding to context information in the middle of processing that is continuously acquired is specified as a processing period.

Then, every time when context information acquired by the second acquisitor 33 is determined be in the middle of processing, the extractor 43 extracts sound data that corresponds to acquisition date and time information of date and time matching date and time information represented by the transmission date and time information of the context information or is previous to (older than) the date and time information and closest to the date and time information from the detection information management DB 37A. Then, the extractor 43 stores the extracted sound data in the storage 45 in association with the acquisition date and time information.

By repeating this process, the extractor 43 extracts sound data (processing period detection information) of the processing period specified by the specifier 42 from the sound data (detection information) acquired by the first acquisitor 36. In other words, the extractor 43 extracts sound data of a period corresponding to the processing period included in the sound data acquired by the first acquisitor 36 and stores the extracted sound data in the storage 45.

The storage 45 stores the extracted sound data. The storage 45, for example, is configured by the HDD 65.

More specifically, the storage 45 stores a processing period management DB 45A. FIG. 7 is a schematic diagram illustrating an example of the data configuration of the processing period management DB 45A. The processing period management DB 45A associates a processing period ID, a processing/non-processing determination result, a period, time and date information, and sound data with one another.

The processing period ID is identification information used for identifying each processing period. The processing/non-processing determination result is a determination result (in the middle of processing or not in the middle of processing) of processing/non-processing of context information that is acquired by the specifier 42. The period stored in the processing period management DB 45A represents a processing period. The date and time information stored in the processing period management DB 45A is date and time information that represents the start and the end of the processing period. The sound data stored in the processing period management DB 45A is sound data that is extracted by the extractor 43. For this reason, in the processing period management DB 45A, only sound data (processing period detection information) of the processing period is registered.

By referring back to FIG. 4, the determiner 44 determines an occurrence of a defect relating to processing using the processing machine 20 during the processing period based on the sound data (processing period detection information) of the processing period and the context information used for specifying the processing period. Hereinafter, the sound data (processing period detection information) of the processing period will be referred to as processing period sound data.

First, the determiner 44 extracts characteristic information (characteristic amount) representing characteristics of the processing period sound data. The characteristic information may be any information as long as the information represents characteristics of the processing period sound data. For example, in a case where detection information is sound data collected using a microphone, the determiner 44 may extract characteristic amounts such as energy, a frequency spectrum, and a Mel frequency cepstrum coefficient (MFCC).

Then, the determiner 44 calculates a likelihood of the characteristic information extracted from the processing period sound data by using a corresponding model 45B. The likelihood of the characteristic information represents a likelihood of the operation of the processing machine 20 being normal.

A model 45B is information that defines the characteristic information of detection information detected when the processing machine 20 normally operates in an operation status represented by the context information. The model 45B is actually measured using the processing machine 20 in advance and is generated in advance for each context information.

The determiner 44 learns the model 45B corresponding to each context information in advance by using the characteristic information of detection information detected when the processing machine 20 normally operates. A learning method and the form of a model to be learned may be any method and any form. For example, a model such as a Gaussian mixed model (GMM), a hidden Markov model (HMM), or the like and a corresponding model learning method may be applied. Then, the determiner 44 may store the model 45B generated through learning in the storage 45 in association with context information used for the leaning in advance. In addition, the model 45B may be generated by an external apparatus and be stored in the storage 45 in advance.

Then, the determiner 44 calculates a likelihood of the characteristic information extracted from the processing period sound data by using the model 45B of the context information corresponding to the processing period sound data at the time of determining the occurrence of a defect relating to the processing using the processing machine 20. The determiner 44 compares the likelihood with a threshold set in advance and, for example, in a case where the likelihood is the threshold or more, determines that the operation of the processing machine 20 is normal. On the other hand, in a case where the likelihood is less than the threshold, the determiner 44 determines that the operation of the processing machine 20 is abnormal.

In addition, the determiner 44 may determine the occurrence of a defect relating to the processing using the processing machine 20 during the processing period based on the processing period sound data and the context information used for specifying the processing period, and a determination method used by the determiner 44 is not limited to the determination method described above. For example, instead of directly comparing the value of the likelihood with the threshold, the determiner 44 may compare a value representing a change in the likelihood with a threshold.

Then, the determiner 44 outputs a result of the determination. For example, the determiner 44 outputs the result of the determination to an external apparatus, a display, or the like.

Figure 8:
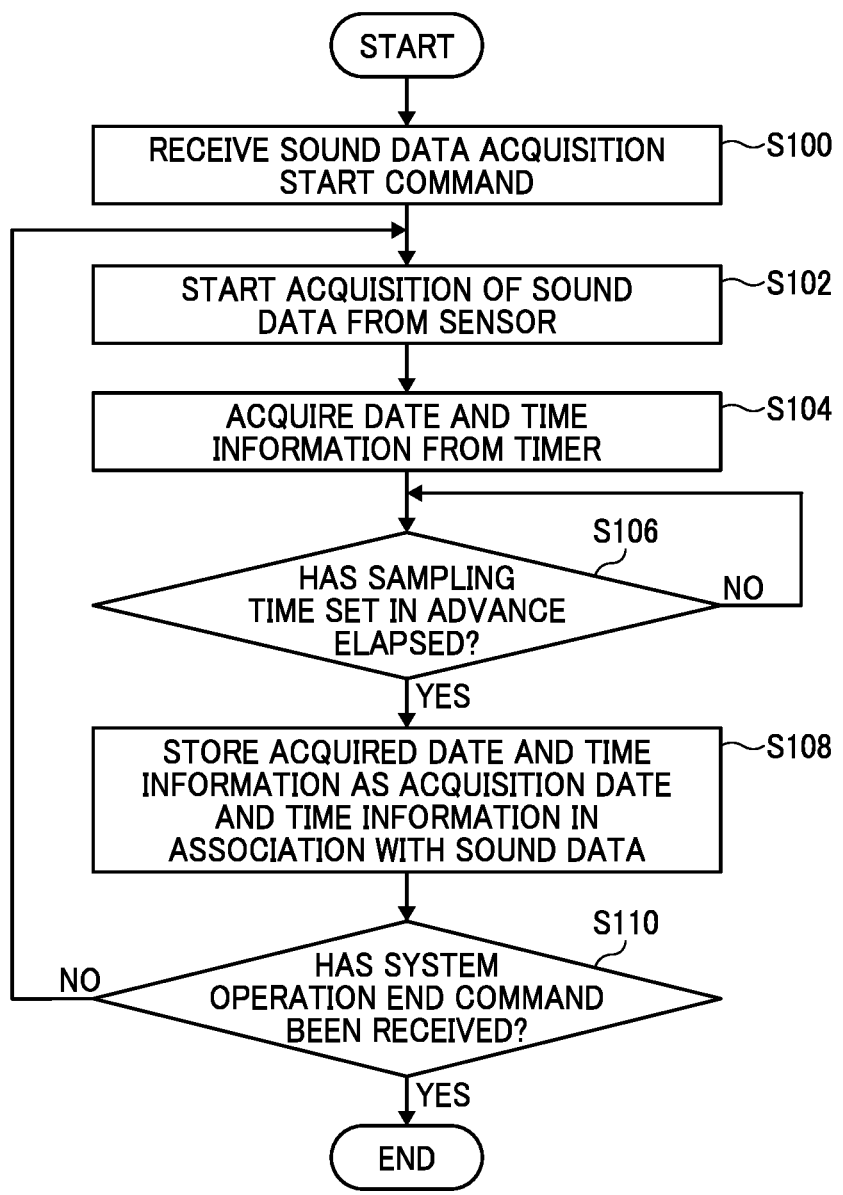
FIG. 8 is a flowchart illustrating an example of a sound data acquiring process.
Figure 9A:
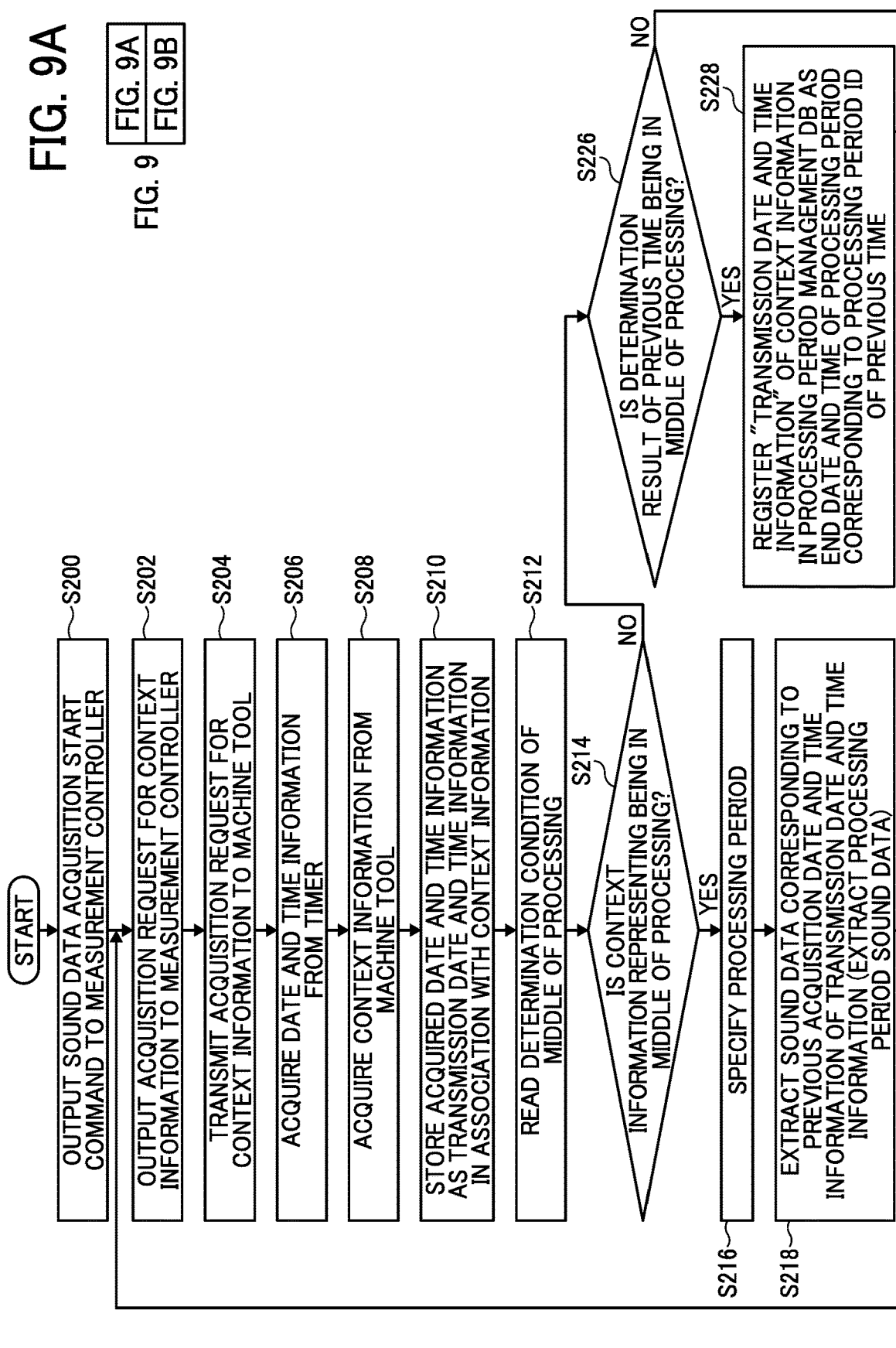
FIGS. 9A and 9B (FIG. 9) are a flowchart illustrating an example of an abnormality determining process.
Figure 9B:
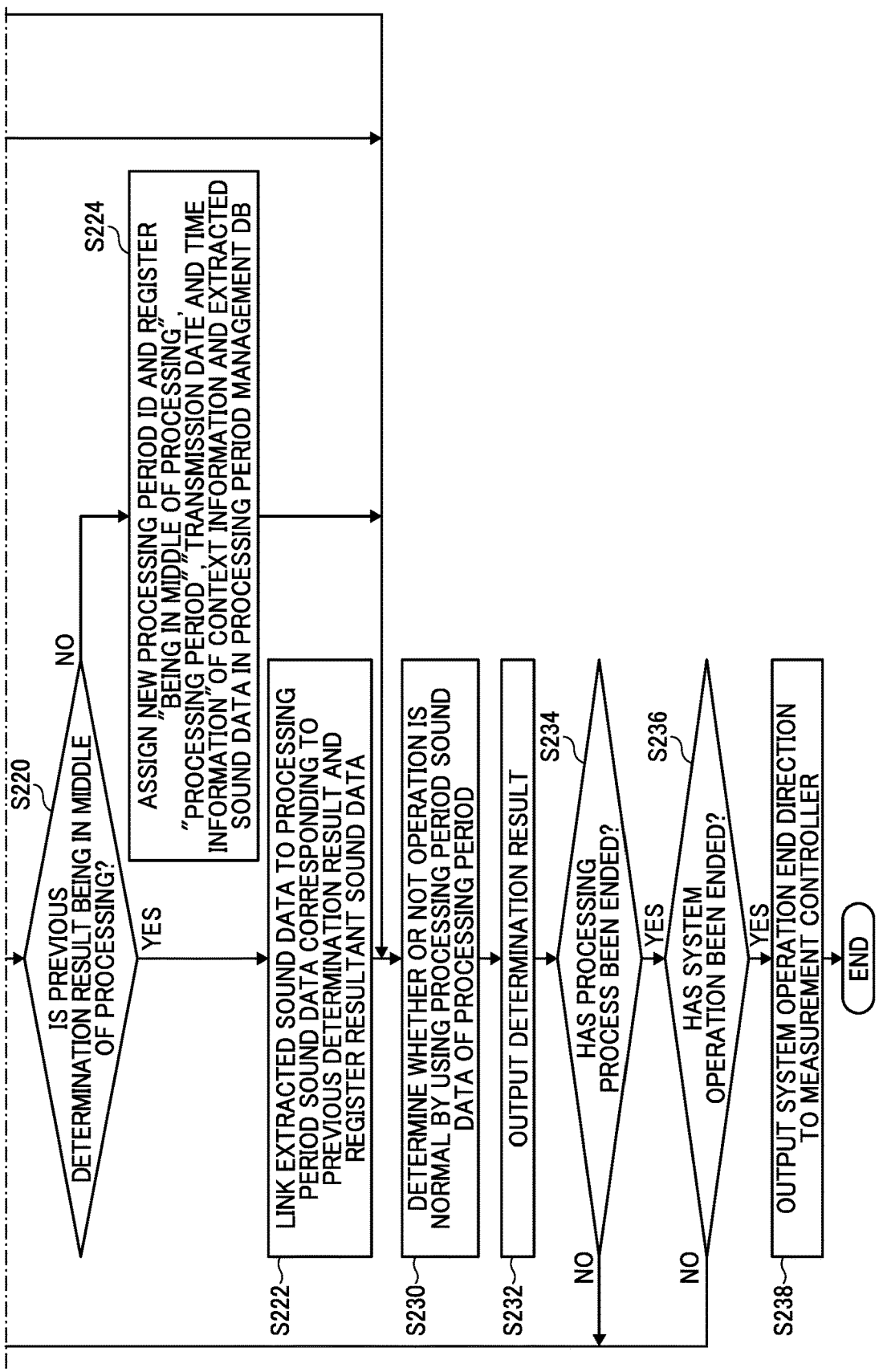

Next, the sequence of information processing performed by the diagnosis apparatus 10 according to this embodiment will be described. FIGS. 8 and 9 are flowcharts that illustrate an example of the information processing performed by the diagnosis apparatus 10 according to this embodiment.

First, a sound data (detection information) acquiring process included in the information processing performed by the diagnosis apparatus 10 according to this embodiment will be described. FIG. 8 is a flowchart illustrating an example of the sound data acquiring process.

First, the first acquisitor 36 receives a sound data acquisition start command from the task controller 41 (Step S100). When the sound data acquisition start command is received, the first acquisitor 36 starts acquiring sound data from the sensor 25 (Step S102).

The first acquisitor 36 acquires date and time information from the timer 49 (Step S104) and repeats a negative determination until a sampling time set in advance is determined to elapse (Step S106: No). Then, in a case where the sampling time set in advance is determined to elapse (Step S106: Yes), the first acquisitor 36 causes the process to proceed to Step S108.

This sampling time is assumed to be shorter than the processing time in which the diagnosis apparatus 10 performs a series of processes of Steps S202 to S234 (see FIG. 9) to be described later.

The first acquisitor 36 stores the acquired sound data in the detection information management DB 37A with the date and time information acquired in Step S104 associated with the acquired sound data as acquisition date and time information (Step S108).

Then, the first acquisitor 36 determines whether or not a system operation end command has been received (Step S110). The system operation end command is a signal that represents the end of all the operations in the information processing system 1000. In a case where No is determined in Step S110 (S110: No), the process proceeds to Step S102. On the other hand, in a case where Yes is determined in Step S110 (Step S110: Yes), this routine ends.

The first acquisitor 36 repeatedly performs the process of Steps S102 to S108 until Yes is determined in Step S110, whereby sound data corresponding to each sampling time is sequentially stored in the detection information management DB 37A (see FIG. 5).

Next, an abnormality determining process included in the information processing performed by the diagnosis apparatus 10 according to this embodiment will be described. FIG. 9 is a flowchart illustrating an example of the abnormality determining process.

First, the task controller 41 outputs a sound data acquisition start command to the first communication controller 35 (first acquisitor 36) of the measurement controller 30 (Step S200). According to the process of Step S200, the sound data acquiring process described with reference to FIG. 8 is started.

Next, the task controller 41 outputs an acquisition request for context information to the second acquisitor 33 (Step S202). The second acquisitor 33 that has received the acquisition request for context information transmits the acquisition request for context information to the processing machine 20 (Step S204).

The second acquisitor 33 acquires date and time information from the timer 49 (Step S206). Accordingly, the second acquisitor 33 acquires the date and time information (transmission date and time information) representing the transmission date and time of the acquisition request of Step S202.

Next, the second acquisitor 33 acquires context information from the processing machine 20 (Step S208). Next, the second acquisitor 33 stores the date and time information acquired in Step S206 as the transmission date and time information in the context management DB 34A of the first storage 34 in association with the context information acquired in Step S208 (Step S210).

Next, the specifier 42 reads a processing determination condition relating to the context information acquired in Step S208 (Step S212). In Step S212, the specifier 42 reads both a determination condition stored in advance and the processing determination condition included in the context information acquired in Step S208 as determination conditions.

Here, the determination condition stored in advance will be assumed to be a condition that the value represented by the operation item "the operation state of the processing machine 20" is "in operation", and the value represented by the operation item "shaft moving state" is "cutting moving" in the description. In addition, in the description, it will be assumed that the operation item "processing determination condition" is included in the context information acquired in Step S208, and the value (for example, the threshold of the drill rotation number) represented by this "processing determination condition" is 1,000 rpm.

Next, the specifier 42 determines whether or not the context information acquired in Step S208 represents being in the middle of processing (Step S214). The specifier 42 performs the determination of Step S214 by determining whether or not the context information acquired in Step S208 satisfies the reading determination condition in Step S212.

In a case where the context information representing being in the middle of processing is determined (Step S214: Yes), the process proceeds to Step S216. The specifier 42 species the date and time of the date and time information (transmission date and time information) acquired in Step S206 to be within the processing period and registers the date and time information (transmission date and time information), the processing/non-processing determination result "middle of processing", and the period "processing period" in the processing period management DB 45A in association with one another (Step S216).

Next, the extractor 43 extracts sound data corresponding to the acquisition date and time information that is immediately before the date and time information (in other words, the date and time information (transmission date and time information) acquired in Step S206) from the detection information management DB 37A (Step S218).

Next, the extractor 43 determines whether or not the determination result of step S214 of the previous time is "middle of processing" (Step S220). In a case where the determination result of the previous time is "middle of processing" (Step S220: Yes), the process proceeds to Step S222.

In Step S222, the extractor 43 links the sound data extracted in Step S218 to the sound data extracted at the previous time and registers the linked sound data as one piece of sound data in the processing period management DB 45A (Step S222). The sound data extracted at the previous time is sound data that is registered in the processing period management DB 45A in the process of Step S222 of the previous time in accordance with the determination of "middle of processing" of Step S214 of the previous time. Then, the process proceeds to Step S230.

On the other hand, in Step S220, in a case where the determination result of the previous time is determined to be "not in the middle of processing (Step S220: No), the process proceeds to Step S224. In addition, also in the case of the first determination of step S220 of the first time after the process of Step S200, No is determined in Step S220 (Step S220: No), and the process proceeds to Step S224.

In Step S224, the extractor 43 assigns a new processing period ID and stores the processing/non-processing determination result "in the middle of processing", the period "processing period", the date and time information (transmission date and time information) acquired in Step S206, and the sound data extracted in Step S218 in the processing period management DB 45A in association with one another (Step S224). Then, the process proceeds to Step S230.

On the other hand, in a case where the context information acquired in Step S208 is determined not to represent being in the middle of processing (in other words, not in the middle of processing) (Step S214: No), the process proceeds to Step S226.

In Step S226, the extractor 43 determines whether or not the determination result of Step S214 of the previous time is "in the middle of processing" (Step S226). In a case where the determination result of the previous time is not "in the middle of processing" (Step S226: No), the process proceeds to Step S230. On the other hand, in a case where the determination result of the previous time is "in the middle of processing" (Step S226: Yes), the process proceeds to S228.

In Step S228, the extractor 43 reads transmission date and time information corresponding to the context information acquired in Step S208 from the context management DB 34A. Then, the extractor 43 registers the read transmission date and time information in the processing period management DB 45A as end date and time of a processing period corresponding to the processing period ID corresponding to the sound data registered in the processing period management DB 45A at the time of determining being in the middle of processing of the previous time (Step S228). Then, the process proceeds to Step S230.

According to the process of Steps S200 to S226, every time when context information is acquired by the second acquisitor 33, sound data corresponding to transmission date and time information corresponding to acquisition date and time information of the context information that is in the middle of processing is extracted from the detection information management DB 37A and is sequentially registered in the processing period management DB 45A as the sound data of the processing period. In addition, while the acquired context information is continuously determined to be in the middle of processing, sound data corresponding to date and time information (the previous date and time information or same date and time information) corresponding to the transmission date and time information of the acquisition request for the context information in the detection information management DB 37A is extracted from the detection information management DB 37A and is registered in the processing period management DB 45A as continuous sound data. Furthermore, in a case where being not in the middle of processing is determined after being in the middle of processing is continuously determined, the transmission date and time information of the acquisition request for the context information used in the determination of being not in the middle of processing is registered in the processing period management DB 45A as the end timing of the processing period.

In addition, sound data corresponding to the acquisition date and time information corresponding to the transmission date and time information of the acquisition request for the context information used in the determination of being not in the middle of processing is not extracted from the detection information management DB 37A and is not registered in the processing period management DB 45A.

For this reason, in the processing period management DB 45A, for every continuous period (processing period) determined to be in the middle of processing, processing period sound data is registered.

In Step S230, the determiner 44 determines the occurrence of a defect relating to processing using the processing machine 20 during the processing period based on the processing period sound data registered in the processing period management DB 45A and the context information used for specifying the processing period (Step S230).

Then, the determiner 44 outputs a result of the determination (information representing an operation normality or an operation abnormality) (Step S232). Next, the task controller 41 determines whether or not to end the processing process (Step S234). For example, the task controller 41 performs the determination of Step S234 by determining whether or not a signal representing temporary stop is received.

In a case where the processing process is continued (Step S234: No), the process is returned to Step S202. On the other hand, in a case where the processing process ends (Step S234: Yes), the process proceeds to Step S236.

In Step S236, the task controller 41 determines whether or not the task controller 41 ends the operation of the information processing system 1000 (Step S236). For example, the task controller 41 performs the determination of Step S236 by determining whether or not an operation command for power-off of the diagnosis apparatus 10 or the like is received.

In a case where the system operation is continued (Step S236: No), the process is returned to Step S202. On the other hand, in a case where the system operation ends (Step S236: Yes), the process proceeds to Step S238. In Step S238, a system operation end command is output to the first communication controller 35 of the measurement controller 30 (Step S238). According to the process of Step S238, the first acquisitor 36 ends the process of acquiring sound data from the sensor 25. Then, this routine ends.

As described above, the diagnosis apparatus 10 (information processing apparatus) according to this embodiment includes the first acquisitor 36, the second acquisitor 33, the specifier 42, the extractor 43, and the determiner 44. The first acquisitor 36 acquires detection information of a physical quantity changing according to the operation state of the processing machine 20 (target device) that processes a target object. The second acquisitor 33 transmits an acquisition request to the processing machine 20 at predetermined time and acquires context information relating to the operation status of the processing machine 20 as a response to the acquisition request. The specifier 42 specifies a processing period in which the target device is in the middle of processing of a target object based on the context information and the predetermined time (transmission date and time information) at which the acquisition request is transmitted. The extractor 43 extracts processing period sound data (processing period detection information) of the specified processing period from the detection information. The determiner 44 determines the occurrence of a defect relating to processing using the processing machine 20 (target device) during the processing period based on the processing period detection information and the context information used for specifying the processing period.

In this way, the diagnosis apparatus 10 according to this embodiment specifies a processing period based on the context information. Then, the diagnosis apparatus 10 extracts processing period sound data of the specified processing period from the sound data acquired by the first acquisitor 36. Then, the determiner 44 determines the occurrence of a defect relating to processing using the processing machine 20 by using the processing period sound data.

Figure 10:
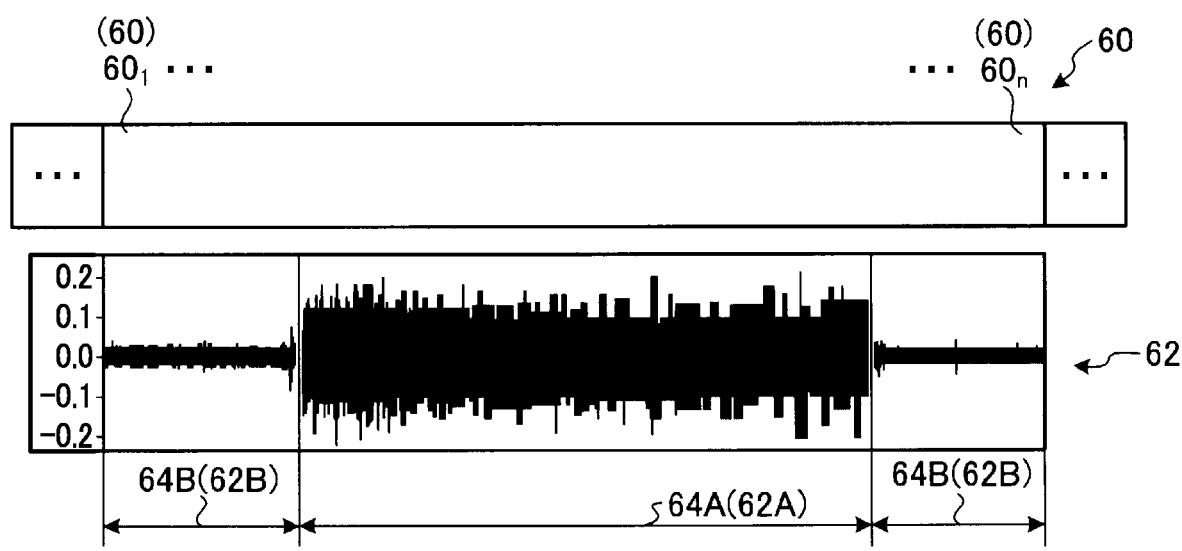
FIG. 10 is a diagram illustrating processing period sound data.

FIG. 10 is a diagram of the processing period sound data. As illustrated in FIG. 10, in detection information 62 such as the sound data acquired by the first acquisitor 36 from the sensor 25, detection information 62A such as a sound generated during a processing period 64A in which the processing machine 20 is in the middle of processing of a target object and detection information 62B such as a sound generated during a non-processing period 64B other than the processing period 64A are included. For this reason, the diagnosis apparatus 10 according to this embodiment specifies the processing period 64A by using context information 60 (context information $60_1$ to context information $60_n$ (here, n is an integer of two or more)). Then, the diagnosis apparatus 10 determines the occurrence of a defect relating to processing using the processing machine 20 by using the detection information 62A of the specified processing period 64A in the detection information 62.

Thus, according to the diagnosis apparatus 10 of this embodiment, the accuracy of the abnormality diagnosis can be improved.

In addition, the first acquisitor 36 starts acquisition of detection information before the second acquisitor 33 starts the acquisition of context information.

In a case where the second acquisitor 33 acquires context information and, after the specifier 42 specifies a processing period, starts acquisition of detection information, the detection information is acquired delayed from the acquisition of the context information. On the other hand, according to the diagnosis apparatus 10 of this embodiment, the first acquisitor 36 starts acquisition of detection information before the second acquisitor 33 starts acquisition of context information.

For this reason, the diagnosis apparatus 10 according to this embodiment can further improve the accuracy of the abnormality diagnosis.

In addition, the second acquisitor 33 acquires context information from the diagnosis apparatus 10 by transmitting an acquisition request for context information to the diagnosis apparatus 10 (target device) and, every time when the context information is acquired, stores the acquired context information in the first storage 34 (context management DB 34A) in association with the transmission date and time information of the acquisition request corresponding to the context information. The specifier 42 specifies a period represented by transmission date and time information corresponding to the group of one or a plurality of pieces of context information representing that the processing machine 20 is in the middle of processing of a target object among a plurality of pieces of the acquired context information as a processing period.

In addition, the first acquisitor 36 stores the acquired detection information in the second storage 37 (detection information management DB 37A) in association with the acquisition date and time information of the detection information. The extractor 43 extracts processing period sound data (processing period detection information) of the period represented by the acquisition date and time information corresponding to the transmission date and time information represented by the specified processing period from the detection information.

In addition, the first acquisitor 36 acquires date and time information at the time of acquiring the detection information from the timer 49 (date and time timer) and uses the acquired date and time information as acquisition date and time information of the detection information. The second storage 37 acquires date and time information at the time of transmitting an acquisition request from the timer 49 (date and time timer) and uses the acquired date and time information as the transmission date and time information of the acquisition request.

In this way, by managing the date and time information by using the same timer 49, the accuracy of the abnormality diagnosis can be further improved.

The context information includes control information of each of a plurality of operation items of which the types are different from each other. The specifier 42 determines context information of which values represented by a plurality of operation items included in the context information among the plurality of pieces of the acquired context information satisfy a determination condition set in advance representing that the processing machine 20 (target device) is in the middle of processing as context information representing being in the middle of processing and specifies a period represented by the transmission date and time information corresponding to the determined context information as a processing period.

The determiner 44 determines the occurrence of a defect relating to the processing using the processing machine 20 (target device) during the processing period by using a model 45B corresponding to the context information used for specifying the processing period among models 45B representing predicted detection information predicted to be detected when the processing machine 20 (target device) normally operates in an operation status relating to the context information, which is set for each of one or more pieces of context information, and the processing period sound data (processing period detection information).

In addition, the detection information is sound data representing a sound or a sound wave data representing a sound wave.

Second Embodiment

In this embodiment, a form will be described in which at least one of the number and the types of the operation items included in context information acquired from a processing machine 20 is adjusted.

Figure 11:
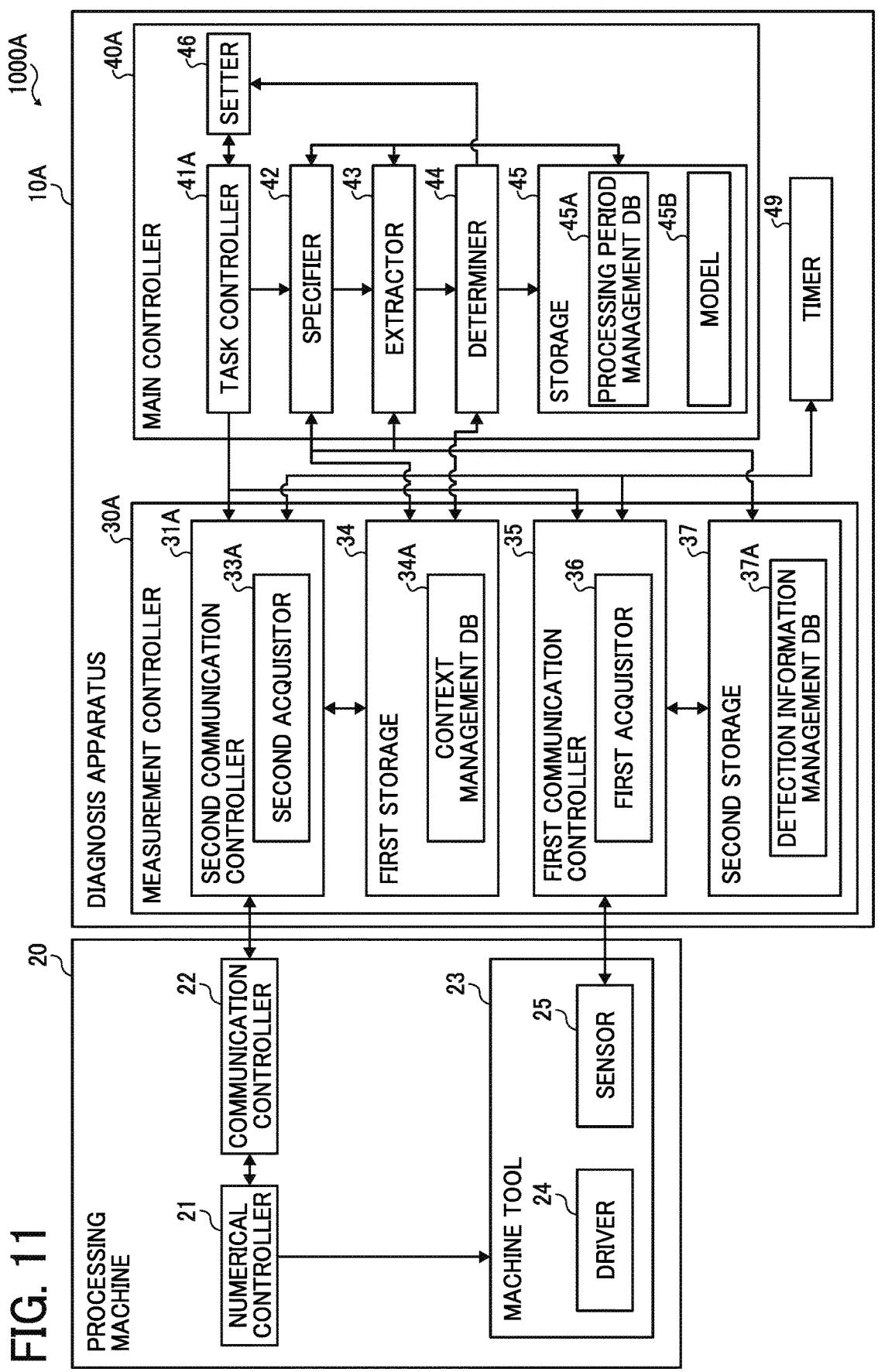
FIG. 11 is a block diagram illustrating an example of the functional configuration of an information processing system.

FIG. 11 is a block diagram illustrating an example of the functional configuration of an information processing system 1000A according to this embodiment. The information processing system 1000A includes a processing machine 20 and a diagnosis apparatus 10A. The processing machine 20 and the diagnosis apparatus 10A are connected to be able to transmit and receive data and signals. The processing machine 20 is similar to that according to the first embodiment. The hardware configuration of the diagnosis apparatus 10A is a configuration illustrated in FIG. 3 and is similar to the diagnosis apparatus 10.

The diagnosis apparatus 10A includes a measurement controller 30A and a main controller 40A. The measurement controller 30A is similar to the measurement controller 30 according to the first embodiment except that a second communication controller 31A is included instead of the second communication controller 31. The main controller 40A is similar to the main controller 40 according to the first embodiment except that a task controller 41A is included instead of the task controller 41, and a setter 46 is further included.

The setter 46 sets at least one of the number and types of operation items included in context information included in context information acquired from the processing machine 20. As described in the first embodiment, the context information includes values of a plurality of operation items of which the types are different from each other. In this embodiment, the setter 46 sets at least one of the number of operation items of a target acquired from the processing machine 20 and the types of operation items of a target to be acquired.

In more details, the setter 46 sets at least one of the number and the types of operation items included in context information acquired next from the processing machine 20 by a second acquisitor 33A based on values of operation items included in context information previously acquired by the second acquisitor 33A.

In this embodiment, the setter 46 sets both the types and the number of operation items by setting the types of operation items included in the context information acquired next from the processing machine 20 by the second acquisitor 33A.

The task controller 41A outputs an acquisition request for context information to the second acquisitor 33A of the second communication controller 31A. In this embodiment, the task controller 41A outputs an acquisition request for context information including setting information representing the types of operation items set by the setter 46 to the second acquisitor 33A. The second acquisitor 33A transmits an acquisition request for context information including setting information, which is received from the task controller 41A, to the processing machine 20.

In the processing machine 20, when the acquisition request for context information is received from the diagnosis apparatus 10A, a numerical controller 21 of the processing machine 20 transmits context information including values of operation items of types represented in the setting information included in the acquisition request to the diagnosis apparatus 10A through a communication controller 22.

In this way, the second acquisitor 33A acquires the context information including values of operation items of types set by the setter 46 from the processing machine 20.

For example, in a case where the operation item "processing determination condition" is included in context information that is acquired at the previous time by the second acquisitor 33A, the setter 46 may set operation items, which are operation items of types other than the operation item "processing determination condition", of a number smaller than that of the previous time (in other words, operation items included in the context information acquired previously) as operation items of context information to be acquired next.

In addition, for example, it is assumed that, in the setter 46, values represented by operation items included in context information that is acquired at the previous time (in other words, previously acquired) by the second acquisitor 33A are values determined to be in the middle of processing, and values represented by operation items included in context information acquired at the time immediately before the previous time are determined to be not in the middle of processing. In this case, the setter 46 sets operation items, which include the operation item "processing determination condition", of a number larger than that of the previous time as operation items of context information to be acquired at the next time.

Then, the second acquisitor 33A acquires context information including the values of the operation items of the types set by the setter 46 from the processing machine 20.

Here, in more details, the second acquisitor 33A generates an acquisition request for context information corresponding to each of the operation items of the types set by the setter 46 and transmits the generated acquisition request to the processing machine 20. Then, the second acquisitor 33A receives context information including the values of the operation items of the types for each of the operation items of the types set by the setter 46 from the processing machine 20.

In other words, the second acquisitor 33A, for one acquisition request received from the task controller 41A, transmits an acquisition request to the processing machine 20 for the number of times corresponding to the number of operation items included in the context information of the acquisition request. Then, the second acquisitor 33A, for the acquisition request, stores a group of transmitted context information including a value corresponding to each of the operation items of the types, which are received from the processing machine 20, in the detection information management DB 37A as one piece of context information corresponding to one acquisition request received from the task controller 41A. At this time, the second acquisitor 33A, for one acquisition request received from the task controller 41A, stores transmission date and time information at which the acquisition request is transmitted to the processing machine 20 first in the detection information management DB 37A as transmission date and time information corresponding to the context information.

In this way, the second acquisitor 33A, for one acquisition request received from the task controller 41A, transmits an acquisition request to the processing machine 20 for the number of times corresponding to the number of the operation items included in the context information of the acquisition request, thereby acquiring context information corresponding to the acquisition request from the processing machine 20.

For this reason, there are cases where the time required for communication between the diagnosis apparatus 10A and the processing machine 20 becomes long as the number of operation items to be received from the processing machine 20 increases. Thus, in the diagnosis apparatus 10A according to this embodiment, the setter 46 sets at least one of the number and the types of operation items included in context information to be acquired next time by the second acquisitor 33A from the processing machine 20 based on the values represented by the operation items included in the context information acquired at the previous time by the second acquisitor 33A.

In this way, according to the diagnosis apparatus 10A of this embodiment, the types or the number of operation items included in the context information acquired from the processing machine 20 is set (in other words, changed) in accordance with the operation status of the processing machine 20. For this reason, a time required for determining whether or not context information is in the middle of processing by using the specifier 42 after the acquisition of the context information using the second acquisitor 33A can be shortened.

For this reason, according to the diagnosis apparatus 10A of this embodiment, compared to the diagnosis apparatus 10 according to the first embodiment, the processing period can be specified more accurately. Accordingly, compared to the diagnosis apparatus 10 according to the first embodiment, the diagnosis apparatus 10A is capable of further improving the accuracy of the abnormality diagnosis of the processing machine 20.

Figure 12B:
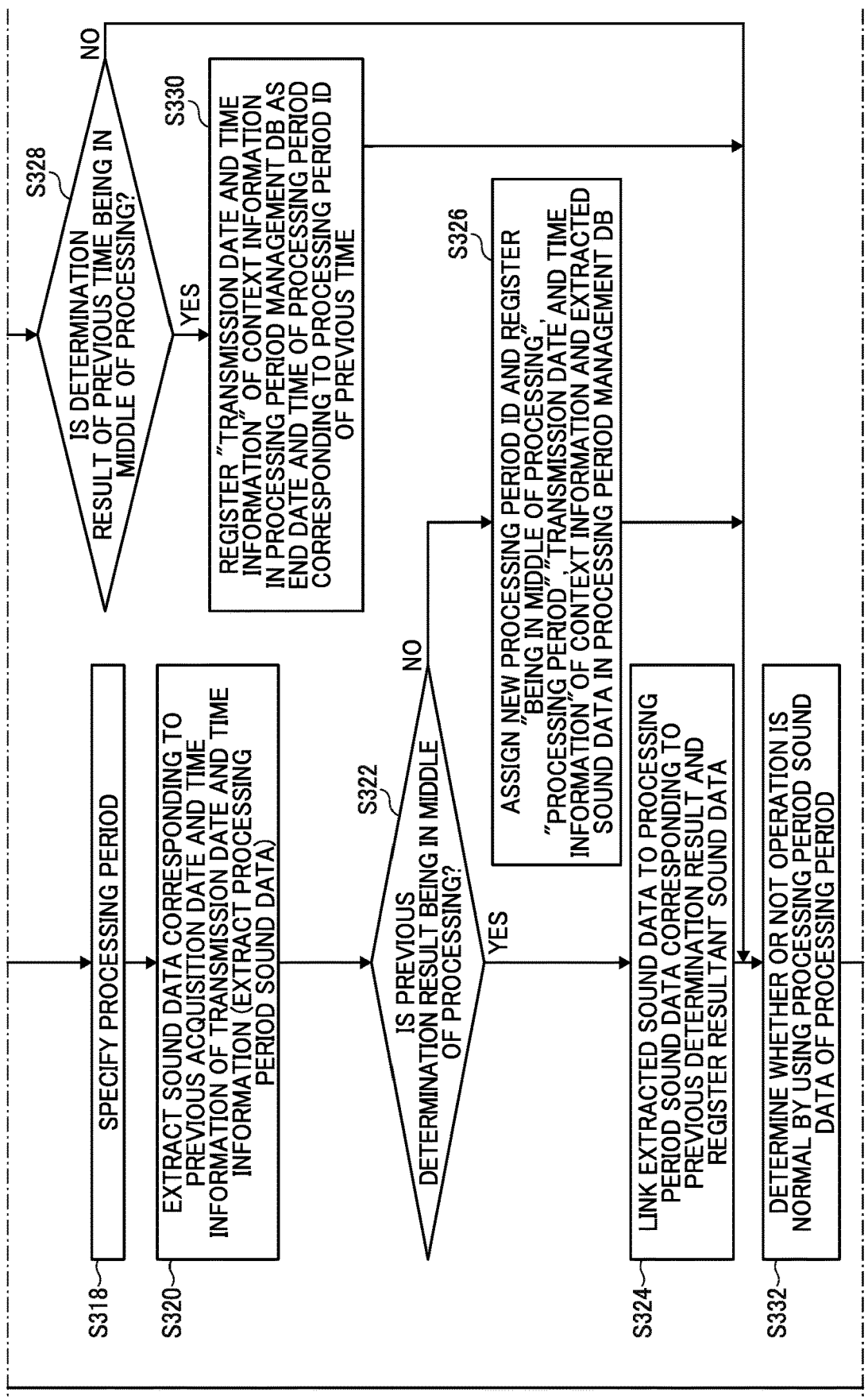
Figure 12C:
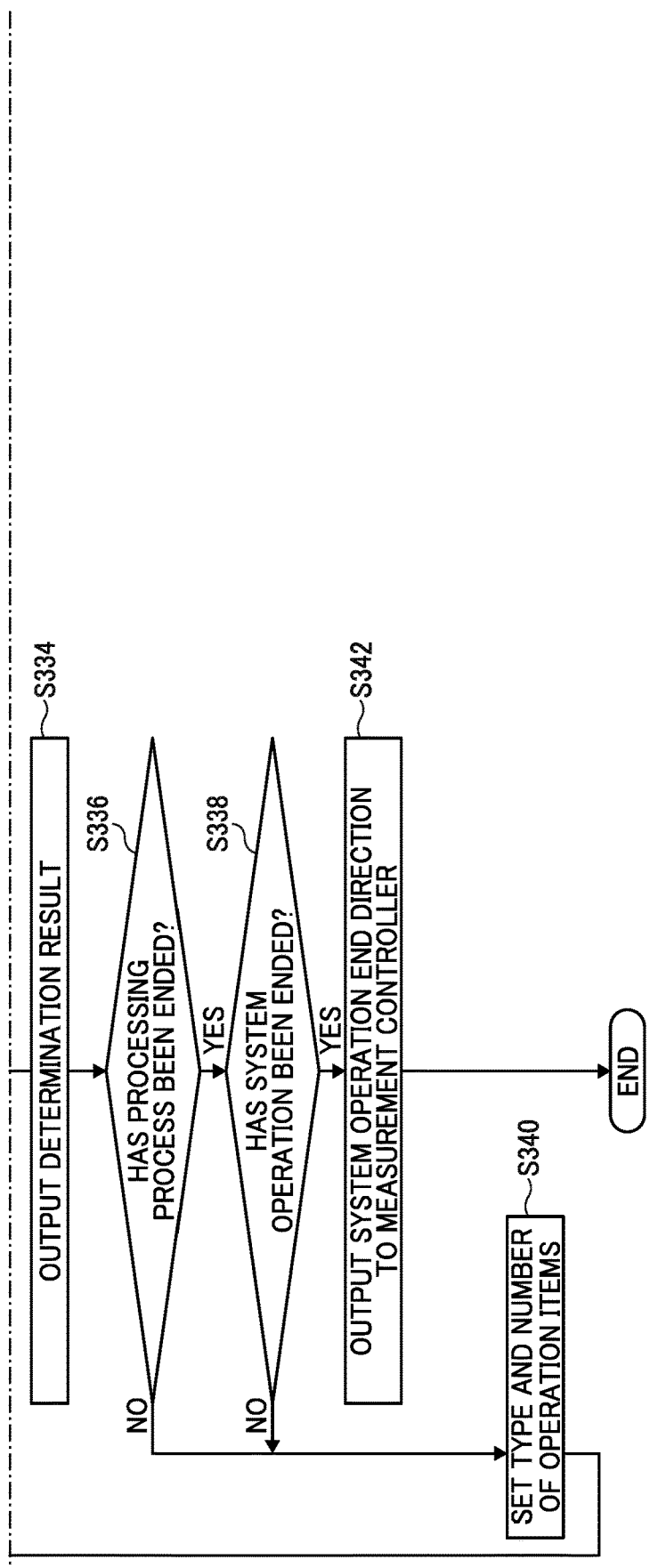

Next, the sequence of the information processing performed by the diagnosis apparatus 10A according to this embodiment will be described. The process of acquiring sound data included in the information processing performed by the diagnosis apparatus 10A is similar to that according to the first embodiment (see FIG. 8). FIG. 12 is a flowchart illustrating an example of an abnormality determining process included in the information processing performed by the diagnosis apparatus 10A according to this embodiment.

First, the task controller 41A outputs a sound data acquisition start command to the second communication controller 31A (the second acquisitor 33A (Step S300)) of the measurement controller 30A. According to the process of Step S300, the sound data acquiring process described with reference to FIG. 8 is started.

Next, the setter 46 sets the types and the number of operation items (Step S302). In Step S302, the setter 46 sets the types and the number of operation items by setting operation items of types set in advance as initial operation items. For example, the setter 46 sets a plurality of types of operation items ("the operation state of the processing machine", "shaft moving state", "drill rotation number", "load", and "processing determination condition") included in context information represented in the context management DB 34A.

Next, the task controller 41A outputs an acquisition request for context information including setting information representing the types of operation items set by the setter 46 to the second acquisitor 33A of the measurement controller 30A (Step S304).

The second acquisitor 33A that has received the acquisition request for context information transmits the acquisition request for context information including setting information, which is received from the task controller 41A, to the processing machine 20 (Step S306).

Then, the diagnosis apparatus 10A performs the process of Steps S308 to S336. The process of Steps S308 to S336 corresponds to the process (see FIG. 9) of Steps S206 to S234 according to the first embodiment.

In other words, the second acquisitor 33A acquires date and time information from the timer 49 (Step S308). Next, the second acquisitor 33A acquires the context information from the processing machine 20 (Step S310). As described above, in Step S310, the second acquisitor 33A, in more details, transmits the acquisition request to the processing machine 20 for the number of times (in other words, the number of the operation items) corresponding of the types of the operation items included in the setting information, thereby receiving context information including the values of the operation items of the types. Then, the second acquisitor 33A uses a group of the received context information as context information (in other words, context information including the values of the operation items of all the types represented in the setting information) acquired from the processing machine 20.

Next, the second acquisitor 33A stores the date and time information acquired in Step S308 as transmission date and time information in the context management DB 34A of the first storage 34 in association with the context information acquired in Step S310 (Step S312).

Next, the specifier 42 reads a determination condition in the middle of processing relating to the context information acquired in Step S310 (Step S314). In addition, in a case where the "processing determination condition" is not included in the context information, the specifier 42 may use a value represented by the "processing determination condition" included in the context information acquired at the previous time as the determination condition.

Next, the specifier 42 determines whether or not the context information acquired in Step S310 represents being in the middle of processing (Step S316). In a case where the context information is determined to represent being in the middle of processing (Step S316: Yes), the process proceeds to Step S318. The specifier 42 specifies that date and time of the date and time information (transmission date and time information) acquired in Step S308 to be date and time within the processing period and registers the date and time information (transmission date and time information), a processing/non-processing determination result "middle of processing", and the period "processing period" in the processing period management DB 45A in association with each one another (Step S318).

Next, the extractor 43 extracts sound data corresponding to the acquisition date and time information that is immediately before the date and time information from the detection information management DB 37A (Step S320). Next, the extractor 43 determines whether or not the result of the determination of Step S316 of the previous time is "middle of processing" (Step S322). In a case where the result of the determination of the previous time is "middle of processing" (Step S322: Yes), the process proceeds to Step S324.

In Step S324, the extractor 43 links the sound data extracted in Step S320 to the sound data extracted at the previous time and stores resultant sound data in the processing period management DB 45A as one piece of sound data (Step S324). Then, the process proceeds to Step S332.

On the other hand, in Step S322, in a case where the result of the determination of Step S316 of the previous time is determined to be "not in the middle of processing" (Step S322: No), the process proceeds to Step S326. In addition, also in the case of the first determination of Step S322 of the first time after the process of Step S300, No is determined in Step S322 (Step S322: No), and the process proceeds to Step S326.

In Step S326, the extractor 43 assigns a new processing period ID and stores the processing/non-processing determination result "in the middle of processing", the period "processing period", the date and time information (transmission date and time information) acquired in Step S308, and the sound data extracted in Step S320 in the processing period management DB 45A in association with one another (Step S326). Then, the process proceeds to Step S332.

On the other hand, in a case where the context information acquired in Step S316 is determined not to represent being in the middle of processing (in other words, not in the middle of processing) (Step S316: No), the process proceeds to Step S328.

In Step S328, the extractor 43 determines whether or not the determination result of Step S316 of the previous time is "in the middle of processing" (Step S328). In a case where the determination result of the previous time is "being in the middle of processing" (Step S328: Yes), the process proceeds to S330.

In Step S330, the extractor 43 reads transmission date and time information corresponding to the context information acquired in Step S310 from the context management DB 34A. Then, the extractor 43 registers the read transmission date and time information in the processing period management DB 45A as end date and time of a processing period corresponding to the processing period ID corresponding to the sound data registered in the processing period management DB 45A at the time of determining being in the middle of processing of the previous time (Step S330). Then, the process proceeds to Step S332.

In Step S332, the determiner 44 determines the occurrence of a defect relating to the processing using the processing machine 20 during the processing period based on the processing period sound data registered in the processing period management DB 45A and the context information used for specifying the processing period (Step S332).

Then, the determiner 44 outputs a result of the determination (information representing an operation normality or an operation abnormality) (Step S334). Next, the task controller 41A determines whether or not the processing process ends (Step S336). In a case where the processing process is continued (Step S336: No), the process proceeds to Step S340.

In Step S340, the setter 46 sets the number and the types of the operation items included in context information acquired at the next time by the second acquisitor 33A from the processing machine 20 based on the values represented by the operation items included in the context information acquired in Step S310 (Step S340).

As described above, for example, in a case where the operation item "processing determination condition" is included in the context information (in other words, context information acquired at the previous time by the second acquisitor 33A) acquired in Step S310, the setter 46 sets operation items, which are operation items of types other than the operation item "processing determination condition", of a number smaller than that of the previous time as operation items of context information to be acquired at the next time. In this case, in a next time, the second acquisitor 33A, for operation items of a number smaller than that of the previous time, acquires context information including values represented by the operation items from the processing machine 20.

In addition, for example, in the setter 46, it is assumed that values represented by the operation items included in the context information acquired previously in Step S310 (in other words, acquired at the previous time) are values determined to be in the middle of processing, and values represented by the operation items included in the context information acquired at the time that is previous to the previous time are values determined to be not in the middle of processing. In this case, the setter 46 sets operation items, which include the operation item "processing determination condition", of a number larger than that of the previous time as operation items of context information to be acquired at the next time.

In other words, according to such a setting, for example, the setter 46 sets the types of operation items such that, for date and time corresponding to the initial timing of the processing period, context information including the value represented by the operation item "processing determination condition" is acquired from the processing machine 20. In addition, the setter 46, for a period until date and time that is after the initial timing of the processing period and corresponds to the final timing of the processing period, sets the types of operation items such that context information not including the value of the operation item "processing determination condition" is acquired.

Then, the process is returned to Step S304. On the other hand, in a case where Yes is determined in Step S336 (Step S336: Yes), the process proceeds to Step S338.

In Step S338, the task controller 41A determines whether or not to end the operation of the information processing system 1000A (Step S338). In a case where the system operation is continued (Step S338: No), the process proceeds to Step S340. On the other hand, in a case where the system operation ends (Step S338: Yes), the process proceeds to Step S342. In Step S342, a system operation end command is output to the first communication controller 35 of the measurement controller 30A (Step S342). Then, this routine ends.

As described above, in the diagnosis apparatus 10A according to this embodiment, the setter 46 sets at least one of the number and the types of operation items included in context information acquired from the processing machine 20 (target device). The second acquisitor 33A transmits an acquisition request for context information including a value of the operation item of at least one of the number and the types, which are set, to the processing machine 20.

In this way, in the diagnosis apparatus 10A according to this embodiment, the setter 46 can adjust the number and the types of operation items included in context information acquired from the processing machine 20 in accordance with the state. For this reason, operation items that are necessary for performing a determination of being in the middle of processing based on the context information can be appropriately adjusted.

Thus, according to the diagnosis apparatus 10A of this embodiment, in addition to the effects of the first embodiment, the accuracy of the abnormality diagnosis can be further improved.

In addition, the setter 46 sets at least one of the number and the types of operation items included in context information acquired next time by the second acquisitor 33A based on the values represented by the operation items included in context information acquired at the previous time by the second acquisitor 33A.

For this reason, in the diagnosis apparatus 10A according to this embodiment, the types and the number of operation items included in context information acquired from the processing machine 20 can be set according to the operation status of the processing machine 20. For this reason, a time required for determining whether or not context information represents being in the middle of processing by using the specifier 42 after the acquisition of the context information using the second acquisitor 33A can be shortened.

By shortening the time that is necessary for the determination, the specifier 42 can specify date and time at the initial timing or the end timing of the processing period more delicately. In other words, the specifier 42 can specify the processing period at higher accuracy.

Therefore, according to the diagnosis apparatus 10A of this embodiment, in addition to the effects of the first embodiment, the accuracy of the abnormality diagnosis can be further improved.

In addition, programs executed by the diagnosis apparatus 10 and the diagnosis apparatus 10A according to the embodiments described above are provided with being built in a ROM or the like in advance.

The programs executed by the diagnosis apparatus 10 and the diagnosis apparatus 10A according to the embodiments described above may be recorded on a computer-readable recording medium such as a CD-ROM, a flexible disk (FD), a CD-R, or a digital versatile disk (DVD) in a file of an installable form or an executable form and be configured to be provided as a computer program product.

In addition, the programs executed by the diagnosis apparatus 10 and the diagnosis apparatus 10A according to the embodiments described above may be configured to be stored on a computer connected to a network such as the Internet and be provided by being downloaded through the network. Furthermore, the programs executed by the diagnosis apparatus 10 and the diagnosis apparatus 10A according to the embodiments described above may be configured to be provided or distributed through a network such as the Internet.

The programs executed by the diagnosis apparatus 10 and the diagnosis apparatus 10A according to the embodiments described above have a module configuration including the units (the communication controller, the determiner, and the like) described above, and, as actual hardware, as a CPU (processor) reads the programs from the ROM and executes the programs, the units are loaded into a main memory device, and the units are generated on the main memory device.

While the embodiments have been described as above, the embodiments are presented as examples but are not intended to limit the scope of the present invention. The novel embodiments described above may be performed in other various forms, and various omissions, substitutions, and changes can be made therein in a range not departing from the concept of the invention. The embodiments described above and modified examples of the embodiments are included in the scope and the concept of the invention and are belong to a range equivalent to inventions described in the claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus communicable with a target device that processes a target object, the information processing apparatus comprising:
processing circuitry configured to,
acquire detection information of a physical quantity that changes according to an operation state of the target device by transmitting an acquisition request to the target device,
receive, from the target device, context information in response to the acquisition request, the context information relating to an operation status of the target device,
specify a processing period in which the target device is processing the target object based on at least the context information and a transmission time associated with transmitting the acquisition request such that the processing period excludes at least one non-processing period,
extract processing period detection information from the detection information based on the processing period such that the extracted processing period detection information includes a first portion of the detection information and does not include at least one second portion of the detection information corresponding to the at least one non-processing period, and
determine an occurrence of a defect relating to processing by the target device based on the processing period detection information and the context information used for specifying the processing period.

2. The information processing apparatus according to claim 1, wherein the processing circuitry is configured to start acquiring the detection information before receiving the context information.

3. The information processing apparatus according to claim 1, wherein the processing circuitry is configured to,
transmit the acquisition request to the target device and record the transmission time associated with transmission of the acquisition request, the acquisition request requesting the context information,
store, in a first memory, the context information in association with the transmission time, and
select a period represented by the transmission time, corresponding to one or more items of the context information indicating that the target device is processing the target object, as the processing period.

4. The information processing apparatus according to claim 3, wherein the processing circuitry is configured to,
store, in a second memory, the detection information in association with a detection time associated with acquiring the detection information, and
extract, from the detection information, the processing period detection information of a period represented by the detection time corresponding to the transmission time.

5. The information processing apparatus according to claim 4, further comprising:
a timer configured to acquire at least, the detection time and the transmission time.

6. The information processing apparatus according to claim 1, wherein the context information includes control information of each of a plurality of operation items of which types are different from each other, and the processing circuitry is configured to,
transmit the acquisition request to the target device and record the transmission time associated with transmission of the acquisition request, the acquisition request requesting the context information,
determine the context information satisfying a condition, as the context information representing processing the target object, the condition being a condition in which values represented by a plurality of operation items included in the context information each indicate that the target device is processing the target object, and
specify a period represented by the transmission time as the processing period.

7. The information processing apparatus according to claim 6, wherein the processing circuitry is configured to,
set at least one of a number and the types of the operation items included in the context information acquired from the target device, and
transmit the acquisition request for the context information including values of the operation items of at least one of the number and the types that are set to the target device.

8. The information processing apparatus according to claim 7, wherein the processing circuitry is configured to set at least one of the number and the types of the operation items included in the context information to be acquired at a next time, based on values represented by the operation items included in the context information acquired at a previous time.

9. The information processing apparatus according to claim 1, wherein the processing circuitry is configured to,
select a model from among a plurality of models that are respectively set for one or more items of the context information and represent predicted detection information predicted to be detected when the target device normally operates in an operation state relating to the context information, and
determine the occurrence of the defect relating to processing by the target device during the processing period, using the model corresponding to the context information used for specifying the processing period and the processing period detection information.

10. The information processing apparatus according to claim 1, wherein the detection information is sound data representing a sound or sound wave data representing a sound wave.

11. An information processing system comprising:
the information processing apparatus according to claim 1; and
the target device including,
a detector that detects the physical quantity; and
a transmitter that transmits the detection information of the physical quantity and the context information to the information processing apparatus.

12. The information processing apparatus according to claim 1, wherein the processing circuitry is configured to,
calculate a likelihood of the occurrence of the defect relating to processing by the target device during the processing period based on the processing period detection information and a model corresponding to the context information, and
determine the occurrence of the defect relating to processing by the target device based on the likelihood of the occurrence of the defect and a threshold.

13. An information processing method for processing information relating to a target device that processes a target object, the method comprising:
acquiring detection information of a physical quantity that changes according to an operation state of the target device by transmitting an acquisition request to the target device;
receiving, from the target device, context information in response to the acquisition request, the context information relating to an operation status of the target device;
specifying a processing period in which the target device is processing the target object based on at least the context information and a transmission time associated with transmitting the acquisition request such that the processing period excludes at least one non-processing period;
extracting processing period detection information from the detection information based on the processing period such that the extracted processing period detection information includes a first portion of the detection information and does not include at least one second portion of the detection information corresponding to the at least one non-processing period; and
determining an occurrence of a defect relating to processing by the target device based on the processing period detection information and the context information used for specifying the processing period.

14. The information processing method according to claim 13, further comprising:
transmitting the acquisition request to the target device and record the transmission time associated with transmission of the acquisition request, the acquisition request requesting the context information,
storing, in a first memory, the context information in association with the transmission time, and
select a period represented by the transmission time, corresponding to one or more items of the context information indicating that the target device is processing the target object, as the processing period.

15. The information processing method according to claim 13, further comprising:
selecting a model from among a plurality of models that are respectively set for one or more items of the context information and represent predicted detection information predicted to be detected when the target device normally operates in an operation state relating to the context information, wherein
the determining the occurrence of the defect determines the occurrence of the defect relating to processing by the target device during the processing period, using the model corresponding to the context information used for specifying the processing period and the processing period detection information.

16. The information processing method according to claim 13, further comprising:
calculating a likelihood of the occurrence of the defect relating to processing by the target device during the processing period based on the processing period detection information and a model corresponding to the context information, wherein
the determining the occurrence of the defect determines the occurrence of the defect relating to processing by the target device based on the likelihood of the occurrence of the defect and a threshold.

17. A non-transitory recording medium comprising program code that, when executed by one or more processors, cause the one or more processors to,
acquire detection information of a physical quantity that changes according to an operation state of a target device that processes a target object by transmitting an acquisition request to the target device;
receive, from the target device, context information, the context information relating to an operation status of the target device;
specify a processing period in which the target device is processing the target object based on at least the context information and a transmission time associated with transmitting the acquisition request such that the processing period excludes at least one non-processing period;
extract processing period detection information from the detection information based on the processing period such that the extracted processing period detection information includes a first portion of the detection information and does not include at least one second portion of the detection information corresponding to the at least one non-processing period; and
determine an occurrence of a defect relating to processing by the target device based on the processing period detection information and the context information used for specifying the processing period.

18. The non-transitory recording medium according to claim 17, wherein the one or more processors are further configured to,
select a model from among a plurality of models that are respectively set for one or more items of the context information and represent predicted detection information predicted to be detected when the target device normally operates in an operation state relating to the context information, and
determine the occurrence of the defect relating to processing by the target device during the processing period, using the model corresponding to the context information used for specifying the processing period and the processing period detection information.

19. The non-transitory recording medium according to claim 17, wherein the one or more processors are further configured to,
calculate a likelihood of the occurrence of the defect relating to processing by the target device during the processing period based on the processing period detection information and a model corresponding to the context information, and
determine the occurrence of the defect relating to processing by the target device based on the likelihood of the occurrence of the defect and a threshold.

* * * * *